(12) United States Patent
Vichniakov

(10) Patent No.: US 11,383,818 B2
(45) Date of Patent: Jul. 12, 2022

(54) COMPONENT COMPRISING CONNECTED FIBER COMPOSITE MATERIAL SUB-ELEMENTS AND METHOD AND APPARATUS FOR CONNECTING THE SUB-ELEMENTS

(71) Applicant: Airbus Operations GmbH, Hamburg (DE)

(72) Inventor: Alexei Vichniakov, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 371 days.

(21) Appl. No.: 16/416,992

(22) Filed: May 20, 2019

(65) Prior Publication Data

US 2019/0367147 A1 Dec. 5, 2019

(30) Foreign Application Priority Data

May 29, 2018 (DE) .......................... 102018112850.9

(51) Int. Cl.
*B64C 1/00* (2006.01)
*B29C 65/00* (2006.01)
(Continued)

(52) U.S. Cl.
CPC ................ *B64C 1/12* (2013.01); *B29C 65/02* (2013.01); *B29C 65/568* (2013.01); *B64C 2001/0072* (2013.01)

(58) Field of Classification Search
CPC .... B64C 1/00; B64C 1/10; B64C 1/12; B29C 65/00; B29C 65/02; B29C 65/50; B29C 65/56; B29C 65/568
See application file for complete search history.

(56) References Cited

U.S. PATENT DOCUMENTS 3,015,293 A 1/1962 Parham
9,963,218 B2 5/2018 Vichniakov
(Continued)

FOREIGN PATENT DOCUMENTS

DE 1609889 A 8/1971
DE 102009009491 A1 9/2010
(Continued)

OTHER PUBLICATIONS

German Office Action from corresponding German Patent Application No. 102018112850.9.
(Continued)

*Primary Examiner* — Jacob T Minskey
*Assistant Examiner* — Matthew Hoover
(74) *Attorney, Agent, or Firm* — Greer, Burns & Crain, Ltd.

(57) ABSTRACT

Connections of sub-elements formed at least partly from fiber composite materials of a component for an aircraft with relatively low manufacturing complexity and the same or improved reliability and improved sealing, by providing different seam connections between the sub-elements. For this purpose, at least an edge region, formed from fiber composite material, of the first sub-element is formed to give a foldover that engages with an edge region of the other sub-element. Preferably, the forming is effected especially with use of thermoplastic materials while heating preferably the entire edge region.

8 Claims, 14 Drawing Sheets

(51) Int. Cl.
    *B64C 1/12* (2006.01)
    *B29C 65/02* (2006.01)
    *B29C 65/56* (2006.01)

(56) References Cited

U.S. PATENT DOCUMENTS

2012/0213955 A1    8/2012  Biesek et al.
2016/0207607 A1*  7/2016  Charles .................. B64C 3/187
2016/0311514 A1*  10/2016  Vichniakov ............... E04C 2/08

FOREIGN PATENT DOCUMENTS

DE    102012024568 A1    3/2016
DE    102014013211 A1    3/2016

OTHER PUBLICATIONS

German Office Action from corresponding German Patent Application No. 102018112850.9 dated Jun. 23, 2021.

* cited by examiner

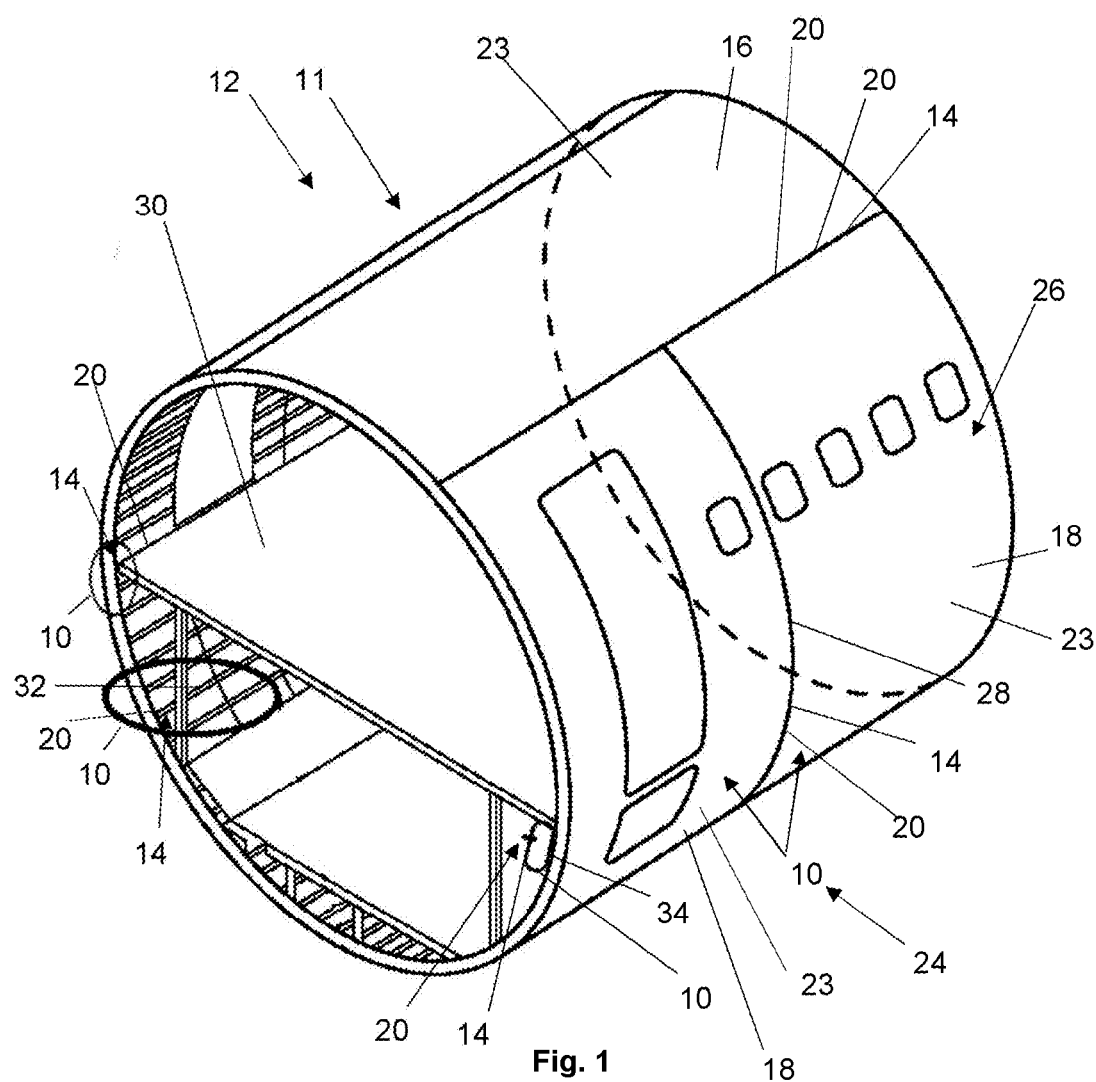
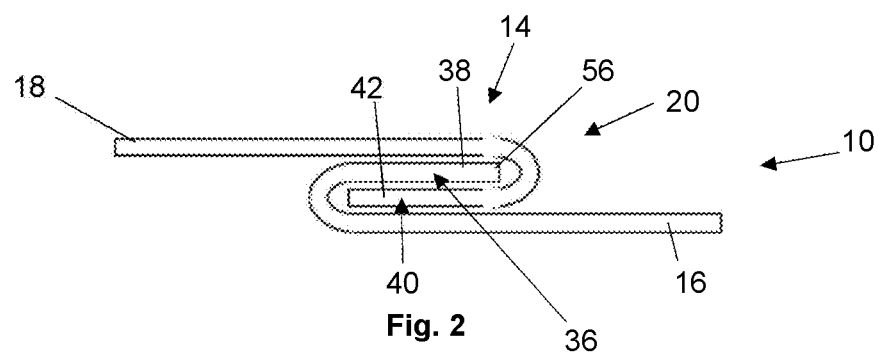

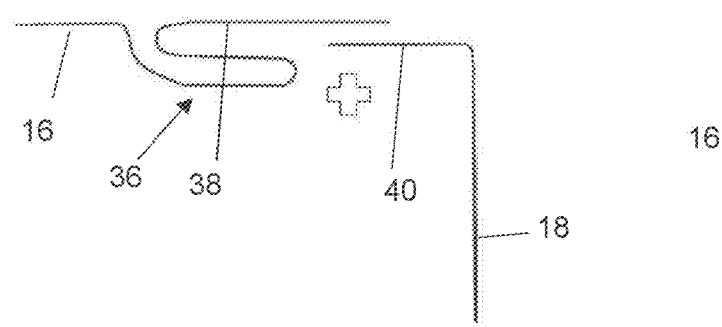
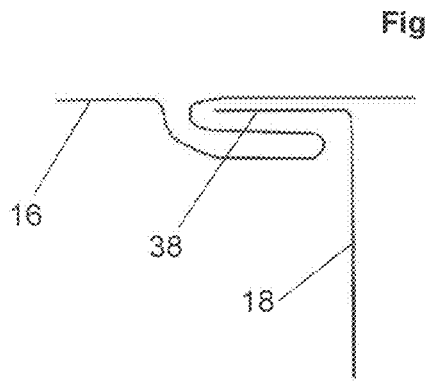
Fig. 30a
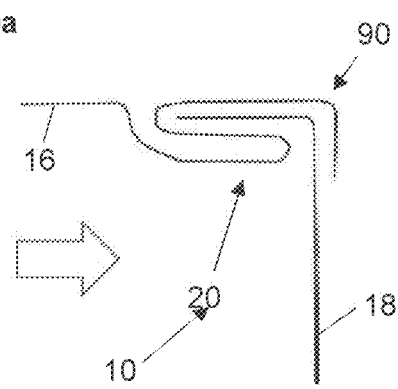
Fig. 30b
Fig. 30c
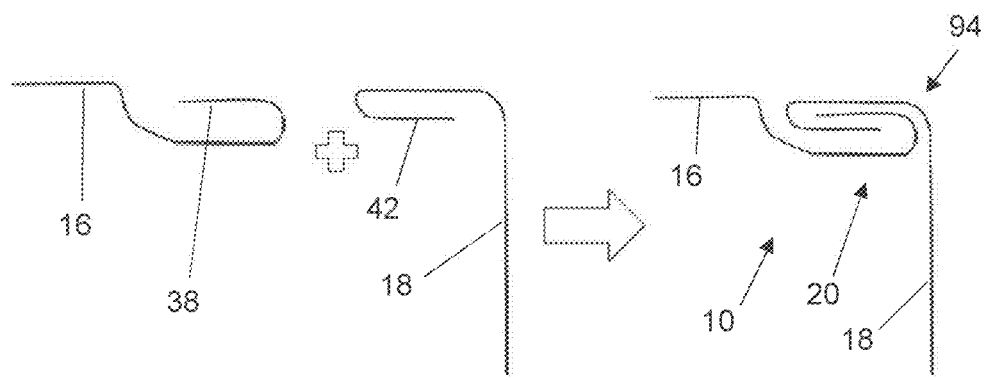
Fig. 31a
Fig. 31b

COMPONENT COMPRISING CONNECTED FIBER COMPOSITE MATERIAL SUB-ELEMENTS AND METHOD AND APPARATUS FOR CONNECTING THE SUB-ELEMENTS

CROSS-REFERENCES TO RELATED APPLICATIONS

This application claims the benefit of the German patent application No. 10 2018 112 850.9 filed on May 29, 2018, the entire disclosures of which are incorporated herein by way of reference.

FIELD OF THE INVENTION

The invention relates to a component for a vehicle, comprising a first sub-element made of a fiber composite material and a second sub-element connected to the first sub-element. The invention further relates to a method and an apparatus for connecting a first sub-element formed from a fiber composite material of a component for a vehicle to a second sub-element of the component. The invention further relates to uses of such a method and of such an apparatus. Finally, the invention relates to an aircraft provided with such a component or with a connection obtainable by employing the method or the apparatus.

BACKGROUND OF THE INVENTION

In the production of vehicles and especially aircraft, in view of the desire for ever more lightweight structures, there is increasing use of components made of fiber composite material. In the production of such components, for example in the assembly of sub-elements of structural components or in the incorporation of constituents into a structure, sub-elements have to be connected to one another. For this purpose, for example, in practice, for example in the production of components of the Airbus A350, fiber composite elements are connected to one another by rivets introduced into drilled holes.

U.S. Pat. No. 9,963,218 B2 proposes a connection of intermeshing fiber composite material sub-elements of structural components by means of adhesive bonding.

SUMMARY OF THE INVENTION

The problem addressed by the invention is that of enabling the connection of a first sub-element formed from composite material to a second sub-element to form a component in a simpler manner from a manufacturing point of view and nevertheless with at least the same reliability or even improved reliability.

In a first aspect, the invention provides a component for a vehicle, especially an aircraft, comprising a first sub-element made of a fiber composite material and a second sub-element, wherein the second sub-element has been connected to the first sub-element by means of a seam connection having a foldover at one edge of the first sub-element.

It is preferable that the second sub-element is formed from a fiber composite material.

Alternatively, the second sub-element may be formed from a metallic material. More particularly, the second sub-element may be formed from a metal or metal alloy. In one embodiment, the second sub-element is formed from a metallic material from the group comprising a. aluminum
b. titanium
c. stainless steel
d. magnesium
e. copper and alloys of the metals a) to e) mentioned.

A component having a sub-element comprising a metal according to one or more of options a, b, c, and d could, for example, be part of a cabin structure or floor structure or a transition to a cabin or floor structure. A component having a sub-element comprising a metal of one of options a and d could, for example, be part of or a transition to a system component, for example a current-conducting part.

It is preferable that the fiber composite material has a thermoplastic matrix.

The seam connection may take various forms. More particularly, all seam connections as known for connection of two metal sheets, for example for food cans or for production of air ducts for building climate control units, at edge regions of sub-elements made of fiber composite material that are still correspondingly deformable are conceivable.

Accordingly, it is preferable that the seam connection has a seam connection from the group comprising a standing seam connection, a flat lock seam connection, a double lock seam connection, a cap strip seam connection, a standing seam connection, an external seam connection, an internal seam connection or groove seam connection, a Pittsburgh lock seam connection and a snaplock seam connection.

It is preferable that at least one of the sub-elements is a sheet element or panel element. Thus, preferably at least one of the sub-elements has a two-dimensional extent. The panel element may be in flat or preferably curved form, for example curved in a cylinder segment shape. For example, at least one of the sub-elements takes the form of a skin element for forming a shell of an aircraft, especially in a fuselage or a wing or an empennage.

It is preferable that at least one of the sub-elements is or has a reinforcing element for a panel.

It is preferable that at least one of the sub-elements has been formed by laminating layers of fiber composite material.

It is preferable that a reinforcing element for a panel has been formed by at least a sub-region of the seam connection.

It is preferable that the component is a component for an aircraft. For example, the component may be a fuselage component, a component of a wing, another structural component or a component that has a structural element and a system component or a cabin component as sub-elements or two system components or two cabin components as sub-elements. The component may also be a component having a system component and a cabin component as sub-elements. Alternatively, the component may be an integral component of a system component or cabin component with two sub-regions connected to one another by means of the seam connection.

In possible configurations, the first sub-element and the second sub-element may be connected directly by the seam connection. For example, an edge region of the second sub-element—for example in the form of a standing seam or a double lock seam—may be accommodated in the foldover formed at the edge region of the first sub-element.

In other configurations, sub-elements of the component may also be connected to one another by the seam connection indirectly, by means of a connecting element, for example a connecting bar, or in the manner of a cap strip seam.

Thus, in a preferred configuration, the component has a third sub-element connected to the first sub-element and/or the second sub-element by means of a seam connection.

The component may, of course, have far more than two or three sub-elements.

It is preferable that the third sub-element is made of fiber composite material.

It is preferable that the second sub-element and the third sub-element are connected via the seam connection by means of the first sub-element.

The first sub-element may thus be a connecting element for connecting multiple other sub-elements of the component. More particularly, the first sub-element may, for example, be an element from a group comprising a connecting element, a reinforcing element, a reinforcing element with a projecting flange; a reinforcing element with a projecting reinforcement fin and an angled reinforcing element.

In another preferred configuration of the component, the first sub-element and the second sub-element are connected via the seam connection by means of the third sub-element.

In this case, the first sub-element and the second sub-element may be main sub-elements of the component to be connected to one another, and the third sub-element may be an auxiliary element for connection of the first sub-element and the second sub-element. For example, the third sub-element may be a connecting element for connection of multiple other sub-elements of the component. More particularly, the third sub-element may, for example, be an element from a group comprising a connecting element, a reinforcing element, a reinforcing element with a projecting flange; a reinforcing element with a projecting reinforcement fin and an angled reinforcing element.

It is preferable that the fiber composite material is selected from a group of fiber composite materials comprising CF/PPS composite material, CF/PEKK composite material, CF/PEEK composite material, CF/PA composite material, fiber composite material with carbon fibers in a thermoplastic matrix, fiber composite material with embedded metal mesh, fiber composite material with embedded bronze mesh, fiber weave in a plastic matrix, unidirectional fibers of a plastic matrix, fibers in a PEEK matrix, fibers in a PA matrix, composite material comprising a mixture of thermoplastic materials with metallic materials, composite material comprising a mixture of thermoplastic materials with aluminum materials, composite material comprising a mixture of thermoplastic materials with titanium materials; carbon fiber weave in a PPS matrix, unidirectional carbon fibers in a PPS matrix, PEKK-impregnated carbon fiber weave, carbon fiber weave in a PEKK matrix, unidirectional carbon fibers in a PEKK matrix, PEKK-embedded carbon fibers with bronze mesh and combinations of the aforementioned materials.

It is preferable that the fiber composite material comprises fibers from the group of fibers comprising carbon fibers, glass fibers, aramid fibers, synthetic fibers, fibers in a fiber weave, fibers in a fiber scrim and unidirectional fibers and combinations of the fibers mentioned.

It is preferable that the fiber composite material comprises a matrix material from a group comprising PE, PP, PA, POM, PET, PC, a transparent plastic, a transparent thermoplastic, transparent PC, PETG, PMMA, plastic alloys, thermoplastic alloys, a high-temperature plastic, a high-temperature thermoplastic, PTFE, PVDF, PEI, PEEK and PEKK.

The sub-elements of the component may be formed from the same material or from different materials. Preferably, the first sub-element and the second sub-element—and optionally the third sub-element—have been formed from one of the above-elucidated fiber composite materials.

In configurations of the component, a first sub-element formed from fiber composite material and a second sub-element formed from a metallic material and/or a third sub-element formed from a metallic material are connected by means of a seam formed on a fiber composite material sub-element.

It is preferable that a filler material has been inserted in at least one foldover of the seam connection.

The filler material may serve for different purposes, as will be elucidated in detail hereinafter.

In a further aspect, the invention provides a method of connecting a first sub-element formed from a fiber composite material of a component for a vehicle to a second sub-element of the component, comprising a) providing the first sub-element having an at least partly deformable edge region;

c) producing a seam connection for connecting of the first and second sub-elements by means of folding the at least partly deformable edge region to form a foldover.

Step a) can be accomplished in various ways. For example, the first sub-element could be provided with an as yet uncured matrix. Preferably, however, the edge region of the first sub-element is rendered formable again after preliminary manufacture of the first sub-element. This is possible simply by heating in the case of thermoplastic materials, for example.

It is preferable that step a) comprises:
producing the first sub-element from fibers and a thermoplastic matrix.

It is preferable that step a) comprises:
producing the first sub-element by laminating layers of fiber composite material.

It is preferable that step a) comprises:
producing the first sub-element essentially from one or more of the following fiber composite materials:
 CF/PPS composite material,
 CF/PEKK composite material,
 CF/PEEK composite material,
 CF/PA composite material,
 fiber composite material with carbon fibers in a thermoplastic matrix,
 fiber composite material with embedded metal mesh,
 fiber composite material with embedded bronze mesh,
 fiber weave in a plastic matrix,
 unidirectional fibers of a plastic matrix,
 fibers in a PEEK matrix,
 fibers in a PA matrix,
 composite material comprising a mixture of thermoplastic materials with metallic materials,
 composite material comprising a mixture of thermoplastic materials with aluminum materials,
 composite material comprising a mixture of thermoplastic materials with titanium materials,
 carbon fiber weave in a PPS matrix,
 unidirectional carbon fibers in a PPS matrix,
 PEKK-impregnated carbon fiber weave,
 carbon fiber weave in a PEKK matrix,
 unidirectional carbon fibers in a PEKK matrix,
 PEKK-embedded carbon fibers with bronze mesh,
 combinations of the aforementioned materials.

It is preferable that step a) comprises:
producing the first sub-element from a fiber composite material having fibers from the group of fibers comprising carbon fibers, glass fibers, aramid fibers, synthetic fibers, fibers in a fiber weave, fibers in a fiber scrim and unidirectional fibers and combinations of the fibers mentioned.

It is preferable that step a) comprises:

producing the first sub-element made of a fiber composite material having a matrix material from the group comprising PE, PP, PA, POM, PET, PC, a transparent plastic, a transparent thermoplastic, transparent PC, PETG, PMMA, plastic alloys, thermoplastic alloys, a high-temperature plastic, a high-temperature thermoplastic, PTFE, PVDF, PEI, PEEK and PEKK.

In some configurations, it is sufficient that solely the forming region, i.e., for example, a region to be folded, of the edge region is still formable.

Accordingly, in one configuration, step a) comprises:

providing the first sub-element having a soft deformable forming region to be folded of the edge region.

For example, step a) comprises:

providing the first sub-element made of a thermoplastic fiber composite material and heating at least regions of a region to be formed of the edge region.

Especially in the case of a sub-element produced by laminating and/or from multiple plies or layers, in experiments in which only the region to be formed has been heated for softening, difficulties occurred in the folding owing to the different radii of curvature for the individual layers or plies.

It is therefore preferable that step a) comprises:

providing the first sub-element in such a way that the entire edge region is soft and deformable.

It is especially preferable that step a) comprises:

providing the first sub-element made of a thermoplastic fiber composite material and heating the entire edge region.

In the case that the deformable edge region is provided by means of heating, this can be accomplished in different ways.

It is preferable that step a) comprises:

heating at least a sub-region of the edge region by means of a heat source from the group of heat sources comprising a burner, a Bunsen burner, an infrared heat radiation source, a laser, a maser, an induction heat source, conduction of heat, a plasma heat source, a heating element embedded or inserted into at least one sub-element, a copper heating element—preferably embedded or inserted into the sub-element, a steel heating element—preferably embedded or inserted into the sub-element, an aluminum heating element—preferably embedded or inserted into the sub-element, a carbon heating element—preferably embedded or inserted into the sub-element, a carbon fiber heating element—preferably embedded into the sub-element, and combinations of the above heat sources or heating elements.

It is preferable that step a) comprises:

heating at least a sub-region of the edge region by at least one of the heating methods of convection heating, radiation heating, infrared heating, laser heating, maser heating, induction heating, heating by means of heat conduction, plasma heating, resistance heating by means of embedded elements, resistance heating by means of embedded copper elements, resistance heating by means of embedded steel elements, resistance heating by means of embedded aluminum elements, resistance heating by means of embedded carbon elements and resistance heating by means of embedded carbon fiber elements.

It is preferable that step c) comprises:

folding the edge region.

It is preferable that step c) comprises:

forming a foldover at the edge region of the first sub-element and inserting an edge region of the second sub-element into the foldover.

If, for example, just a possibly angled edge region of the second sub-element is inserted into the foldover of the first sub-element, it is thus possible to achieve a simple seam connection, for example a standing or flat lock seam connection.

More particularly, it is further preferable that step c) comprises:

forming a foldover at the edge region of the first sub-element, forming a foldover at an edge region of the second sub-element and intermeshing the foldovers of the first and second sub-elements.

By form-fitting intermeshing of two oppositely directed foldovers at the edges of the sub-elements to be connected, it is possible to achieve a double lock seam connection. This may be in flat-lying or standing form or within a duct.

Preferably, the edge regions of the sub-elements to be connected are first preformed and especially at least the foldover on the first sub-element is formed still with a possibly wider opening or greater bending radius and smaller bending angle, then the edge regions are interconnected either in a simple manner or as a double lock seam with a foldover on either side, and then, further preferably, the seam connection is restricted and consolidated, for example by pressing or further forming Accordingly, it is preferable that step c) comprises:

co-forming of the edge region of the first sub-element and an at least partly deformable edge region of the second sub-element.

Especially in the final shaping of the seam connection, this can be accomplished with the edge regions already engaged in a form-fitting manner, for example intermeshed.

It is preferable that step c) comprises:

producing the seam connection as a seam connection selected from a group comprising a standing seam connection, a flat lock seam connection, a double lock seam connection, a cap strip seam connection, a standing seam connection, an external seam connection, an internal seam connection or groove seam connection, a Pittsburgh lock seam connection and a snaplock seam connection.

It is preferable that step c) comprises:

connecting the second sub-element and a third sub-element by means of the first sub-element, which is connected to each of the second sub-element and the third sub-element by a seam connection.

In this case, further preferably, the first sub-element provided is an element from the group comprising a connecting element, a reinforcing element, a reinforcing element with a projecting flange; a reinforcing element with a projecting reinforcement fin and an angled reinforcing element.

In another preferred configuration, step c) comprises:

connecting the first and the second sub-element by means of the third sub-element, which is connected to each of the first sub-element and the second sub-element by a seam connection.

In this case, further preferably, the third sub-element provided is an element from the group comprising a connecting element, a reinforcing element, a reinforcing element with a projecting flange; a reinforcing element with a projecting reinforcement fin and an angled reinforcing element.

It is preferable that step c) comprises:

exerting pressure on the seam connection.

It is preferable that step c) comprises:
consolidating and/or curing the regions of the first and second sub-elements that form the seam connection.

It is preferable that step c) comprises:
inserting a filler material in a foldover that forms the seam connection.

It is preferable that step c) comprises:
inserting a filler material in the seam connection.

The filler material may be one or a combination of two or more of the following filler materials:
a material for sealing,
a sealant material,
a material for forming an edge guard,
a material for improving electrical conductivity,
an electrically conductive material
a material for achieving a defined or desired mechanical property of the seam connection.

It is preferable that step c) comprises:
preforming the edge region of the first sub-element, joining the first sub-element and the second sub-element, finally forming the seam connection.

It is preferable that step c) comprises:
holding the sub-element in a holding device, such that the edge region protrudes therefrom, and bending the edge region.

It is preferable that step c) comprises:
folding the entire edge region in one step.

It is preferable that step c) comprises:
folding the edge region in a continuously advancing manner across its extent.

A preferred configuration of the method is characterized by the step of:
ba) providing the second sub-element made of fiber composite material.

The second sub-element may be provided analogously to first sub-element.

It may be formed from the same material or a different material from the first sub-element.

It is preferable that step ba) comprises:
providing the second sub-element having an at least partly deformable edge region.

It is preferable that step ba) comprises:
producing the second sub-element from fibers and a thermoplastic matrix.

It is preferable that step ba) comprises:
producing the second sub-element by laminating plies of fiber composite material.

It is preferable that step ba) comprises:
producing the second sub-element from a fiber composite material selected from a group of fiber composite materials comprising CF/PPS composite material, CF/PEKK composite material, CF/PEEK composite material, CF/PA composite material, fiber composite material with carbon fibers in a thermoplastic matrix, fiber composite material with embedded metal mesh, fiber composite material with embedded bronze mesh, fiber weave in a plastic matrix, unidirectional fibers of a plastic matrix, fibers in a PEEK matrix, fibers in a PA matrix, composite material comprising a mixture of thermoplastic materials with metallic materials, composite material comprising a mixture of thermoplastic materials with aluminum materials, composite material comprising a mixture of thermoplastic materials with titanium materials; carbon fiber weave in a PPS matrix, unidirectional carbon fibers in a PPS matrix, PEKK-impregnated carbon fiber weave, carbon fiber weave in a PEKK matrix, unidirectional carbon fibers in a PEKK matrix, PEKK-embedded carbon fibers with bronze mesh and combinations of the aforementioned materials.

It is preferable that step ba) comprises:
producing the second sub-element (18) from a fiber composite material having fibers from the group of fibers comprising carbon fibers, glass fibers, aramid fibers, synthetic fibers, fibers in a fiber weave, fibers in a fiber scrim and unidirectional fibers, and combinations of the fibers mentioned.

It is preferable that step ba) comprises:
producing the second sub-element (18) from a fiber composite material having a matrix material from the group comprising PE, PP, PA, POM, PET, PC, a transparent plastic, a transparent thermoplastic, transparent PC, PETG, PMMA, plastic alloys, thermoplastic alloys, a high-temperature plastic, a high-temperature thermoplastic, PTFE, PVDF, PEI, PEEK and PEKK.

It is preferable that step ba) comprises:
providing the second sub-element having a soft deformable forming region to be folded at an edge region to be connected to the first sub-element.

It is preferable that step ba) comprises:
providing the second sub-element in such a way that an entire edge region to be connected to the first sub-element is soft and deformable.

It is preferable that step ba) comprises:
providing the second sub-element made of a thermoplastic fiber composite material and heating at least regions of a region to be formed of an edge region to be connected to the first sub-element.

It is preferable that step ba) comprises:
providing the second sub-element made of a thermoplastic fiber composite material and heating the entire edge region to be connected to the first sub-element.

It is preferable that step ba) comprises:
heating at least a sub-region of an edge region to be connected to the first sub-element by means of a heat source selected from the group of heat sources comprising a burner, a Bunsen burner, an infrared heat radiation source, a laser, a maser, an induction heat source, conduction of heat, a plasma heat source, a heating element embedded or inserted into at least one of the sub-elements, a copper heating element, a steel heating element, an aluminum heating element, a carbon heating element, a carbon fiber heating element and combinations of the above heat sources or heating elements.

It is preferable that step ba) comprises:
heating at least a sub-region of an edge region to be connected to the first sub-element by at least one of the heating methods of convection heating, radiation heating, infrared heating, laser heating, maser heating, induction heating, heating by means of heat conduction, plasma heating, resistance heating by means of embedded or inserted elements, resistance heating by means of embedded copper elements, resistance heating by means of embedded steel elements, resistance heating by means of embedded aluminum elements, resistance heating by means of embedded carbon elements and resistance heating by means of embedded carbon fiber elements.

In another preferred configuration, the method comprises the step of
bb) providing the second sub-element made of a metallic material.

Preferably, step bb) comprises
producing or providing the second sub-element from one or more metallic materials selected from a group of metallic materials comprising aluminum, titanium, steel, stainless steel, magnesium, copper and alloys of the metals mentioned.

In a further aspect, the invention provides an apparatus for connecting a first sub-element, made of a fiber composite material, of a component for a vehicle to a second sub-element of the component, wherein the apparatus comprises:

a forming preparation device for providing the first sub-element having an at least partly deformable edge region; and a seam connection device for producing a seam connection for connection of the first and second sub-elements by means of folding of the at least partly deformable edge region to give a foldover.

Preferably, the forming preparation device comprises a provision device for providing a first sub-element formed at least from fibers and a thermoplastic matrix.

Preferably, the forming preparation device comprises a heating device for heating at least a sub-region to be formed of the edge region.

Preferably, the seam connection device comprises a holding device for holding the first sub-element.

Preferably, the seam connection device comprises a bending device for bending the edge region of the first sub-element.

In a further aspect, the invention provides for use of a method according to any of the above configurations or/and of an apparatus according to any of the above configurations for producing a longitudinal connection across a structural component of a vehicle, especially aircraft. Preference is given to providing a connection that extends in the direction of travel or flight.

For example, panels of a fuselage that are adjacent in circumferential direction may be connected by means of the seam connection.

In a further aspect, the invention provides for use of a method according to any of the above configurations or/and of an apparatus according to any of the above configurations for producing a circumferential connection around the circumference of a structural component of a vehicle, especially aircraft.

For example, panels in a fuselage or cabin of an aircraft that are adjacent in the direction of flight may be connected by means of the seam connection.

In a further aspect, the invention provides for use of a method according to any of the above configurations or/and of an apparatus according to any of the above configurations for coupling frame elements of a structure of a vehicle, especially aircraft, to one another.

In a further aspect, the invention provides for use of a method according to any of the above configurations or/and of an apparatus according to any of the above configurations for coupling of a reinforcing element to a skin element of a structure component for a vehicle, especially aircraft.

In a further aspect, the invention provides for use of a method according to any of the above configurations or/and of an apparatus according to any of the above configurations for coupling of system components of a vehicle, especially aircraft, to one another.

In a further aspect, the invention provides for use of a method according to any of the above configurations or/and of an apparatus according to any of the above configurations for coupling of a system component to a structure of a vehicle, especially aircraft.

In a further aspect, the invention provides for use of a method according to any of the above configurations or/and of an apparatus according to any of the above configurations for coupling of a cabin component to a structure of a vehicle, especially aircraft.

In a further aspect, the invention provides for use of a method according to any of the above configurations or/and of an apparatus according to any of the above configurations for integrating a reinforcing element into a structure of a vehicle, especially aircraft.

In a further aspect, the invention provides for use of a method according to any of the above configurations or/and of an apparatus according to any of the above configurations for integrating a frame element into a structure of a vehicle, especially aircraft.

In a further aspect, the invention provides an aircraft comprising a component according to any of the preceding configurations.

In a further aspect, the invention provides an aircraft comprising a seam connection obtainable by a method according to any of the above configurations.

In a further aspect, the invention provides an aircraft comprising a seam connection obtainable by one of the uses according to any of the above aspects.

Preferred configurations of the invention relate to folded structures and folded connections and especially concepts for folded structures and folded connections and, more particularly, concepts for folded connection for thermoplastic structures.

More particularly, assembly methods and connection methods for thermoplastic composite components are proposed.

With regard to the reliability of the connections and to the construction and manufacturing capacity, the connection of thermoplastic composite components constitutes a challenge.

Particular applications are found by the ideas presented here preferably in the production and arrangement of fuselage components for vehicles such as, in particular, aircraft and more particularly for airplanes. The technology can also be used by helicopters, space vehicles, space stations, rockets, satellites or other objects in aerospace technology, land vehicles, flying or land-based automobiles, etc.

More particularly, preferred configurations of the invention may be employed for optimized arrangement and assembly in future fuselage shells of vehicles and more particularly aircraft.

Preferred configurations of the invention relate to the connection of thermoplastic composite components, especially with connections that can be used alternatively or additionally to welding methods. At present, thermoplastic composite components for aviation are conventionally connected to one another by drilling of holes and riveting to one another. Adhesive bonds are used less frequently and especially rarely in load-bearing regions. Thermoplastic welding methods are being developed further at present and are the subject of current developments.

One aim of preferred configurations of the invention is to use a novel method of bonding thermoplastic materials based on folding principles as known to date in the connection of metallic materials.

Various solutions for seam connection methodology and for seam connections are proposed. Such solutions are suitable particularly, but not only, for thermoplastic materials. Thermoplastic materials are of excellent suitability since they merely have to be heated for forming. But application to other composite materials, for example thermosets, is also possible, for example provided that the regions to be connected are still formable.

Particularly good results have resulted from configurations in which edge regions to be connected are formed from thermoplastic materials and in which the entire edge regions, i.e., both a forming region to be formed for folding and the remaining region, are heated as far as the very edge.

The first tests with the most important materials for thermoplastic developments such as PPS/carbon fiber weave
PEKK/carbon fiber weave
PEKK/unidirectional carbon fibers
PEKK/unidirectional carbon fibers with bronze mesh have shown good results. Application to other composite materials, especially thermoplastic materials, is possible without difficulty.

Preferred configurations of the invention relate to folded structures and concepts for seam connections for thermoplastic structures. These are preferably employed in thermoplastic mechanical methods for preforming components for vehicles.

For example, it is correspondingly possible to connect preforms that are then used to form a final component for vehicles, especially aircraft.

Advantages of configurations of the invention relate more particularly to improved production of connections of joining partners made of composite materials.

Preferably, a less complex process chain with fewer process steps for connection of sub-elements is provided.

No holes are required within fuselage components. There is no need for creation of drillholes to be performed sometimes under ergonomically unfavorable conditions.

The possibility of performing connections without or with fewer drillholes additionally facilitates options of more highly automated manufacture.

Incidentally, the production of seam connections can be more readily automated than the production of connections of composite components known to date. For automation and production of seam connections, it is possible to make use of the wealth of experience in metal connection technology, which can be correspondingly adapted for application to composite components.

Connection by means of seam connections avoids or reduces material-removing methods, and so the formation of carbon dust in the case of carbon fiber-reinforced composite materials is reduced.

Seam connections are, in principle, better hermetically sealed than the connections known to date. In metal technology, seam connections are used, for example, for hermetic sealing of food cans or sheet-metal drums. By seam connection, it is possible to provide fluid-tight connection sites in a simple manner even without sealant.

Connection by means of seam connections does not need any spacers or washers or the like, and so it is possible to save preparation time compared to connection methods known to date by means of fastener elements.

In addition, the avoidance of drillholes avoids cutting of fibers, and so the connection regions in the case of the seam connections proposed here offer higher structural strengths at the remaining edge regions to be bonded than existing connection methods.

The lack of encroachment into internal structures additionally further reduces the risk of delamination.

The seam connection creates a form-fitting connection between the sub-elements to be bonded. In this way, mechanical connection between the fibers in the different parts to be bonded is achieved. Thus, the structural strength of the connection is increased compared to connections known to date.

Compared to welding methods, further advantages result from less complex manufacture. Less pressure has to be exerted on the connection region. Moreover, seam connections need lower temperatures than weld connections.

The seam connections are also suitable for connection of sub-elements that are both formed from composite materials. There is no tendency to cracking or fatigue phenomena. Moreover, simple hermetically impervious connections can be created.

Preferred configurations of the invention utilize a seam connection for production of a connection seam between individual regions of a component.

Preferably, for bonding of a first sub-element formed from fiber composite material to a second sub-element, a seam connection using a foldover on the first sub-element is used.

The terms that relate here to seam connections are taken from the technology of seam connections for metal sheets.

In metal technology, a foldover refers to the doubling-over of the edge of a piece of sheet metal by creasing or swing-folding. Correspondingly, a fold-over refers here to the doubling-over of the edge at a margin of the sub-element to be bonded, especially by creasing or swing-folding or else by forming the foldover directly in the production of the sub-element. The foldover can increase the stiffness of the sub-element provided with the foldover, such that a high stiffness is achievable even with a thinner sub-element. Preferably, the foldover gives rise to a rounded edge.

A foldover can also be referred to as a doubling-over or as a seam.

Preferably, folded structures and folded connections with thermoplastic materials are proposed.

Possible designs of seam connections and the general principles for production of seam connections can be taken from metal sheet connection technology in terms of principle. For example, for production of the seam connection, the edge region of the first sub-element can be creased, then the second sub-element to be connected can be inserted into the creased region, and then the folded-over edge can be pressed onto the inserted region of the second sub-element.

The first sub-element and second sub-element refer here to the connection partners for a connection site in a component, particularly for a vehicle and more particularly for an aircraft, of which at least one connection partner and preferably both connection partners are formed from composite materials.

The sub-elements may be separately produced elements that are joined together to form a component. Alternatively, the sub-elements may be different regions of an integral workpiece; for example, the first sub-element could be a first wall region of a tube and the second sub-element a second wall region of a tube, such that the tube is completed by connection of the sub-elements.

The individual forming steps for forming the edge regions to be bonded to one another of the sub-elements may be comparable to those as known in the case of metal sheets for forming of the different seam connections. What is different is that the edge regions are formed from composite materials, especially fiber composite materials, and forming methods known for fiber composite materials are used correspondingly. More particularly, in the case of thermoplastic materials, the edge regions or at least the forming regions are heated. The heating is preferably effected at a softening temperature at which the thermoplastic material is soft and deformable but not yet molten.

For instance, it is possible to form the different seam connections, for example a simple standing longitudinal seam, a simple flat-lying longitudinal seam, a double standing longitudinal seam, a flat-lying longitudinal seam, a cap strip seam—i.e., a seam with a special seam strip as connecting element, an external longitudinal seam, an internal longitudinal seam, an edge seam and so forth. A corner connection is also possible.

For example, the seam may be angled by about 90° by creasing of the edge regions to be bonded of sub-elements of two-dimensional configuration, where one of the edge regions for forming of the foldover is longer than the other edge region. Subsequently, this longer edge region can be folded around the shorter edge region configured as a standing seam. Thus, in two sheets or panels made of fiber composite material, the seam connection also simultaneously gives rise, for example, to a reinforcing element composed of at least three plies of composite material that projects inward.

In another seam form—the double lock seam—the edge regions on the first sub-element and the second sub-element are folded over and the folded-over edge regions are engaged with one another. Subsequently, the mutually engaged foldovers are pressed together.

Tests have shown that the seam connections known from sheet metal connection are also of good suitability for connection of edge regions of composite materials and especially thermoplastic composite materials.

For this purpose, in the case of thermoplastic materials, at least the forming region to be folded is heated. The only partial heating of the edge region at the forming region may be an option in the case of sufficiently thin and/or single-ply composite materials.

If, however, the first sub-element whose edge region is to be formed to give a foldover is formed, for example, from multiple plies or layers laminated to one another, it is necessary to bend the external layers in the foldover by a greater radius than the internal layers in the foldover. Thus, in the region of the rounded foldover edge, there can be a tendency to delamination of the individual laminates.

Specifically for multilayer materials, it has been found that a seam connection by foldover is nevertheless very efficiently possible in that the entire edge region is provided in soft and deformable form.

In the case of thermoplastic materials, it is possible, for example, by complete heating of the entire edge region, i.e. both of the forming region and of the rest of the region as far as the edge, to achieve a seam connection with a very low delamination tendency or even zero delamination tendency.

Accordingly, it is preferable that the entire edge region of a thermoplastic first sub-element is heated and then bent in a folding step to give a foldover.

Experiments have shown that even multilayer materials can be efficiently connected by seam connections without delamination by this technique, even though different lengths are clearly apparent at the inner radius and at the outer radius of the corresponding round foldover edge. The change in length is enabled by the correspondingly softened matrix material without apparent delamination.

The seam connections are especially suitable for the applications that follow.

They can be used for production of connection seams, for example of longitudinal connections or circumferential connections on components of vehicles and especially aircraft.

A further option is the coupling of fuselage components by means of the connection technique proposed here.

For example, frames can be coupled to skin elements. It is also possible to couple reinforcing elements, for example stringers (longitudinal reinforcements), to fuselage components.

Another option is the coupling of system constituents to one another. For example, constituents of a fuel system, an air distribution system, of fluid conduction systems, of housings for electrical systems or the like and so forth may be connected to one another.

It is also possible to couple such a system component to the structure of a vehicle by means of the connection technique proposed here.

In another application, it is possible to connect cabin components, for example cabin linings, cabin walls, floor elements and so forth, to the structure or to one another.

As already mentioned above, it is possible to form a reinforcing element via the formation of a seam connection, for example of an internal seam, at edges of the sub-elements to be connected. Moreover, a connecting element for connection of the two sub-elements may be formed as a reinforcing element by means of seam connections. For instance, by the connection technique described here, it is possible to integrate a reinforcing element into the component. It is also possible to integrate frame elements into the component.

For instance, it is possible by the connection technique described here to integrate constituents into the component. For example, integration or coupling of structural constituents, system constituents, cabin constituents, floor constituents, crash elements, brackets, pressure domes and/or constituents thereof is possible.

Preferred configurations of the invention are used in aircraft or helicopters, in rockets and aerospace technology, or in flying and land-based automobiles.

Preferred materials in addition to the materials already mentioned above are also PEEK, PA or other thermoplastic materials.

Another option is the use of a mixture of thermoplastic materials with metallic materials as material for the first sub-element formed from composite material or for all sub-elements. Useful metallic materials include, for example, aluminum or titanium.

It is also possible to connect thermoplastic materials to metal materials by means of the connection technique described here. For example, it is possible to connect a thermoplastic panel by means of a foldover to the panel with a connecting element or a panel made of aluminum or titanium or other materials.

For example, connections of PEKK with aluminum, PEKK with titanium or PPS with titanium and so forth are possible.

Preferably, for production of seam connections, first an edge region of the first sub-element is creased and an edge region of the second sub-element is also creased. The creased edge regions are then preferably joined to one another. The edge regions are then preferably folded over completely and pressed together.

In a preferred configuration, before the final folding-over and consolidating of the seam connection, at least one filler material can still be introduced into the interior of the seam connection. The filler material may serve to establish different desired properties. For example, it can serve as a sealing medium for further improvement of the integrity of the seam connection, which is already very good in any case. According to the use of the seam region, there may also be different demands on the mechanical properties of the seam connection that are achievable via appropriately adapted filler materials. For example, greater elasticity may be desirable in one seam connection, while greater stiffness is desirable in another seam connection. This can be achieved by correspondingly executed filler materials. The filler material can also be used for edge protection, for example in order to seal one end of the seam.

For provision of the still-formable edge region, different heating techniques have been tested on thermoplastic materials. Local heating of the foldover region only is suitable primarily for single-ply composite materials or for composite materials with just a thin fiber ply. Especially in the case of multilayer sub-elements made of thermoplastic materials, heating over the entire connection region results in the possibility of sliding of the layers of laminate against one another, which leads to effective results for seam connections of multi-ply fiber composite components.

Various heat sources have additionally been tested. For example, burners, for example Bunsen burners, are usable. It should particularly be ensured here that surfaces do not overheat.

Preference is therefore given to heating methods that achieve uniform heating, especially of lower-lying layers, without the risk of surface overheating.

Possible examples are infrared heating, laser heating, maser heating, induction heating, conduction heating, plasma heating and resistance heating. Resistance heating is preferably effected by means of inserted elements or more preferably by means of embedded elements. Heating elements that can be inserted or embedded may be formed, for example, from copper, steel, aluminum or carbon. In particular, embedded carbon fiber heating elements may serve for heating.

The folding can be effected mechanically or manually across the entire width. For example, a bending machine as known in terms of principle from the creasing of sheet metal can also be used with appropriate adaptations to the different materials to be handled for creasing of edge regions, provided in correspondingly formable form, of composite materials to be connected.

Another option is automated advancing folding. In one example of a possible process step, an edge region is heated with a tool that runs along the edge and then creased at a forming surface. Automated creasing is also possible across the entire part by means of corresponding automated edge tools. In another variant, the first sub-element is manufactured with the foldover at the edge to be connected directly in the course of production.

The sub-elements correspondingly prefabricated with a foldover can then be fitted together in a form-fitting manner. Preferably, in that case, the connection partners joined are ultimately consolidated.

This can be achieved by heating and exertion of manual pressure on the form-fittingly joined connection partners and the corresponding connection zone.

Here too, automated ultimate consolidation is of course possible by corresponding tools.

Another option is the use of additional materials for filling of gaps, for example for hermetic sealing of an edge guard, for improvement of electrical conductivity or for improvement of mechanical properties and so forth.

BRIEF DESCRIPTION OF THE DRAWINGS

The invention is elucidated in detail hereinafter with reference to the appended drawings. The drawings show:

FIG. 1 is a perspective, part-sectional view of a fuselage segment of an aircraft in which various components have sub-elements connected by means of seam connections;

FIG. 2 is a section through a connection site between a first sub-element and a second sub-element of a component with a first embodiment of a seam connection;

FIGS. 30a-30c are profile views of a first sub-element and a second sub-element during different phases for formation of a further embodiment of the seam connection;

FIGS. 31a-31b are profile views of a first sub-element and a second sub-element during different phases for formation of a further embodiment of the seam connection;

DETAILED DESCRIPTION OF THE PREFERRED EMBODIMENTS

Figure 3:
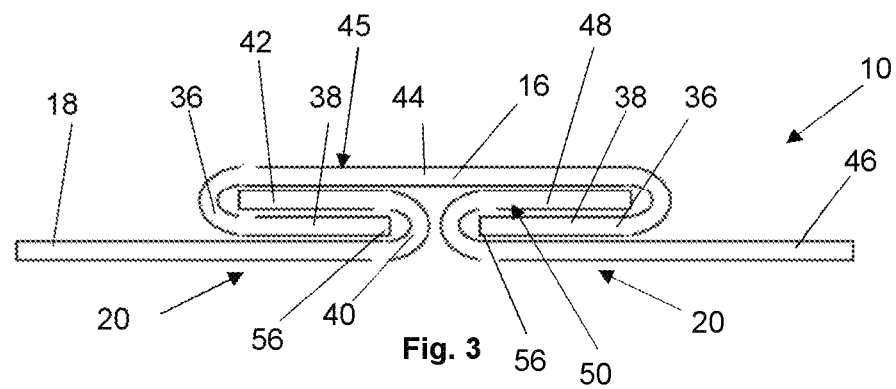
FIG. 3 is a section through a connection site between sub-elements of a component with a second embodiment of a seam connection.

FIG. 1 shows, in part-perspective and part-sectional view, a fuselage segment 11 with different working examples of components 10 of an aircraft 12, in which at least a first sub-element 16 and a second sub-element 18 are connected at a connection site 14 by means of a seam connection 20.

At least the first sub-element 16 is formed from a fiber composite material. The fiber composite material preferably has carbon fibers in a thermoplastic matrix.

The connection site 14 with the seam connection 20 is, for example, a longitudinal connection 22 between skin elements 23 of the fuselage segment 11 that take the form of sheet elements or panel elements. Such mutually connected skin elements 23 are thus a first example of the sub-elements 16, 18 of a component 10 of the aircraft 12 that are connected by means of the seam connection 20. In that case, component 10 takes the form, for example, of a structural component 24 for formation of a fuselage 26 of the aircraft 12.

Other examples of the connection site 14 are connections 28 that run in circumferential direction between the skin elements, which form sub-elements 16, 18 of the component 10 in the form of a structural component 24 that are connected by means of the seam connection 20.

In addition, the connection site 14 may be provided between a cabin component 30—for example the floor of a cabin—and the structure component 24. Here, the cabin component 30 forms one of the sub-elements 16, 18 and the structural component 24 the other of the sub-elements 16, 18.

Further examples of the sub-elements 16, 18 that are connected to one another by means of the seam connection 20 to give a component are a skin element 23 of the structure component 24 as one of the sub-elements 16, 18 and a reinforcing element 32, for example a stringer or a frame element, as the other of the sub-elements 16, 18.

Also shown in FIG. 1 is a fluid conduit 34 as an example of a system component of a functional system of an aircraft 12, wherein the fluid conduit 34 is connected at a connection site 14 by means of the seam connection 20. Here, in that case, different regions of the fluid conduit 34 that are to be bonded to one another at their edges constitute further examples of the sub-elements 16, 18.

In all these examples, in each case, at least a first sub-element 16 made of a fiber composite material is bonded to a second sub-element 18 by means of a seam connection 20 in order thus to form a component 10 of a vehicle, especially aircraft 12.

FIGS. 2 and 3 show different preferred working examples of the seam connection 20.

In all the working examples of the seam connection shown here, and especially the working examples shown in FIGS. 2 and 3, at least the first sub-element 16 as elucidated above is made of a fiber composite material. At least the first sub-element 16 has a foldover 38 at an edge region 36 to form a seam connection 20.

In the embodiment of the seam connection 20 shown in FIG. 2, the first sub-element 16 and the second sub-element 18 are directly connected by the seam connection 20. For this purpose, the second sub-element 18 also has a further foldover 42 at the edge region 40 to be connected to the first sub-element 16. The sub-elements 16, 18 are mutually engaged by their foldovers 38, 42 and consolidated.

In the embodiment of the seam connection 20 according to FIG. 3, the first sub-element 16 takes the form of a connecting element 44 and is especially formed as a bar-like connecting element 44 having the foldover 38 at each of the two longitudinal edges. Similar seam connections formed by means of a connecting element 44 are also referred to in metal connection technology as a cap strip connection. The connecting element 44 forms a cap strip seam 45 that covers and protects the formed edge regions 36, 40, 50.

The second sub-element 18 provided with a foldover 42 can be connected to a third sub-element 46 by means of the first sub-element 16 in the form of a connecting element 44. The third sub-element 46 may also have a foldover 48 at the edge region 50 to be bonded to the second sub-element 18.

The second sub-element 18 and the third sub-element 46 may be formed from the same material or from different materials from the first sub-element 16. Preferably all sub-elements 16, 18, 46 are made of a fiber composite material and more preferably made of a fiber composite material with a thermoplastic matrix.

In some embodiments, the fiber composite material contains carbon fibers, glass fibers, aramid fibers and/or synthetic fibers.

In some embodiments, the fiber composite material contains a thermoplastic material as matrix. In some embodiments, the matrix material comprises at least one of the following thermoplastic materials:

a. a standard material, for example
  i. PE (polyethylene)
  ii. PP (polypropylene)
b. a construction plastic, for example
  i. PA (polyamide, especially PA 6/PA 6 C/PA 66/PA 46/PA 12)
  ii. POM (polyoxymethylene)
  iii. PET (polyethylene terephthalate)
  iv. PC (polycarbonate)
c. a transparent plastic, for example
  i. PC (polycarbonate)
  ii. PETG (polyethylene terephthalate glycol)
  iii. PMMA (polymethylmethacrylate)
d. a plastic alloy
e. a high-temperature plastic, for example
  i. PTFE (polytetrafluoroethylene)
  ii. PVDF (polyvinylidene fluoride)
  iii. PEI (polyetherimide)
  iv. PEEK (polyetheretherketone)
  v. PEKK (polyetherketoneketone)

Preferred composite materials are, for example:
CF/PPS composite material,
CF/PEKK composite material,
CF/PEEK composite material,
CF/PA composite material,
fiber composite material with carbon fibers in a thermoplastic matrix,
fiber composite material with embedded metal mesh,
fiber composite material with embedded bronze mesh,
fiber weave in a plastic matrix,
unidirectional fibers of a plastic matrix,
fibers in a PEEK matrix,
fibers in a PA matrix,
composite material comprising a mixture of thermoplastic materials with metallic materials,
composite material comprising a mixture of thermoplastic materials with aluminum materials,
composite material comprising a mixture of thermoplastic materials with titanium materials,
carbon fiber weave in a PPS matrix,
unidirectional carbon fibers in a PPS matrix,
PEKK-impregnated carbon fiber weave,
carbon fiber weave in a PEKK matrix,
unidirectional carbon fibers in a PEKK matrix,
PEKK-embedded carbon fibers with bronze mesh, and
combinations of the aforementioned materials.

In some embodiments, composite materials with nonconductive fibers, for example glass fibers, are used in at least one of the sub-elements 15, 18, 46, especially to form regions with electrical insulation, for example in the case of system constituents.

The second sub-element 18 and the third sub-element 46 may also be formed from materials other than the first sub-element 16, for example from metal as well. For instance, a tight connection of simple construction of a fiber composite material sub-element 16 to a metal part, for example made of aluminum material or a titanium material, is also possible.

In some embodiments, accordingly, the second sub-element 18 and/or optionally the third sub-element 46 are formed from a metallic material. In some embodiments, the second sub-element and/or the third sub-element, for this purpose, is formed from a metallic material from the group comprising
 a. aluminum
 b. titanium
 c. steel, especially stainless steel
 d. magnesium
 e. copper
and alloys of the metals a) to e) mentioned.

The seam connection 20 may be formed in the manner known for seam connections in the field of connection to sheet metal parts. Unlike in the case of sheet metal seam connections, however, it is not a metal but an edge region 36 of fiber composite material that is folded over.

For forming of the seam connection 20, the edge regions 36, 40, 50 to be formed in each case should be prepared such that they can be formed correspondingly. For this purpose, preferably, the sub-elements 16, 18, 46 are formed from a thermoplastically formable material, i.e., for example, from fibers—especially in a weave or unidirectional fibers—in a thermoplastic matrix. It is of course also possible for further materials to be present as well in the sub-elements 16, 18, 46. More particularly, it is also possible for heating elements—not described here in detail—or other functional elements to be embedded.

For forming of the corresponding edge regions 36, 40, 50, when they are in the form of thermoplastic materials, they are preferably heated correspondingly prior to the forming and/or during the forming To form the seam connection 20 according to FIGS. 2 and 3, the edge regions 36, 40, 50 are preferably first correspondingly formed, then the sub-elements 16, 18 or 16, 18, 46 are joined with their foldovers engaging or intermeshing with one another. Subsequently, there is preferably final forming of the seam connection 20 by ultimate forming of the foldovers 38, 42, 48, for example by application of heat and compressing. Thereafter, the connection site 14 is left to cure in order thus to form the firm seam connection 20.

The component 10 formed from the sub-elements 16, 18 and optionally 46 may at first take the form, for example, of a pre-form and then subsequently be ultimately formed to give a structural component 24, the combination of cabin component 30 and structural component 24, or to give the fluid conduit 34.

In another embodiment, the component 10 is already complete apart from the joining of the sub-elements 16, 18, 46 and is merely assembled by production of the seam connection 20.

The seam connection 20 may be used instead of or in addition to connection techniques used to date by means of drilling of holes and riveting and/or instead of or in addition to welding of the sub-elements 16, 18, 46.

Elucidated in detail hereinafter, with reference to the representation in FIGS. 4 to 15, are the steps for production of the seam connection 20 according to the different embodiments. More particularly, FIGS. 4 to 8 show the production of the foldover 38 at the edge region 36 of the first sub-element 16. With appropriate technology, it is also possible to produce the foldovers 42, 48 of the other sub-elements 18, 46. The further figures, FIGS. 9 to 15, show edge forms producible by this forming method and further steps for completion of the seam connection 20.

More particularly, FIGS. 4 to 8 and FIGS. 14 and 15 show, in schematic form, different devices of an apparatus 51 for connection of the first sub-element 16 to the second sub-element 18. The apparatus 51 has a forming preparation device 59 for providing the first sub-element 16 with a deformable edge region 36 and a seam connection device 64 for production of the seam connection 20.

Figure 4:
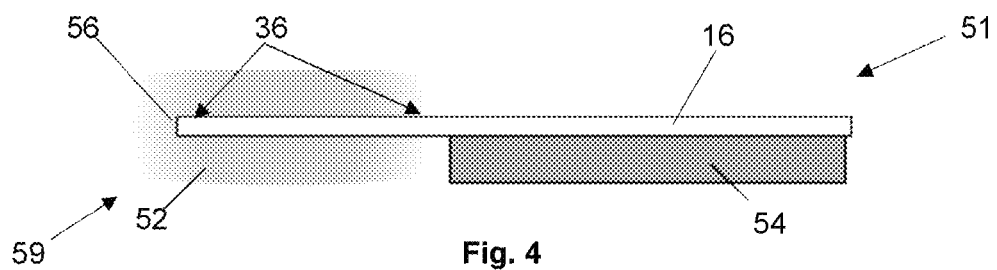
FIG. 4 is a schematic view of an edge region of a first sub-element of the component to illustrate a first step of a process for producing a seam connection.

FIG. 4 shows the forming preparation device 59 and illustrates a step of providing the first sub-element 16 with a soft deformable edge region 36 which is performable thereby. For this purpose, the forming preparation device 59 has at least one heating device 52 for heating the edge region 36. The heating device 52 may have, for example, one or more of the following heat sources:
 a burner, e.g., a Bunsen burner,
 an infrared heat radiation source,
 a laser,
 a maser,
 an induction heat source,
 conduction of heat,
 a plasma heat source,
 a heating element embedded or inserted into the sub-element 16, especially
  made of copper,
  made of steel,
  made of aluminum,
  made of carbon, especially carbon fiber.

Moreover, the forming preparation device 59 may have a provision device (not shown in detail) for providing the first sub-element 16, for example by supplying the sub-element 16 from a manufacturing site, and a support 54 or another device for fixing of the first sub-element 16.

In the forming preparation step, the first sub-element 16 is fixed on the support 54 and then heated by the heating device 52 at least in the edge region to be folded over. Especially when the sub-elements 16, 18, 46 are formed from multilayer fiber composite material, the edge region 50 overall is heated by means of the heating device 52. The edge region 50 is thus heated not just in its forming region but up to the edge 56. The heating is effected to softening temperature at which the matrix material of the edge region is plastically deformable but not yet liquefied.

Figure 5:
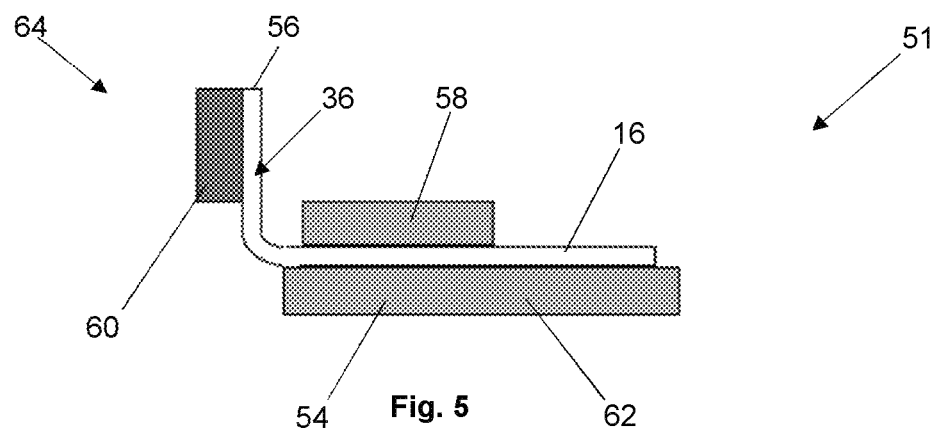
FIGS. 5-8 are side views of an edge region of the first sub-element during different steps of a method of producing the seam connection.
Figure 6:
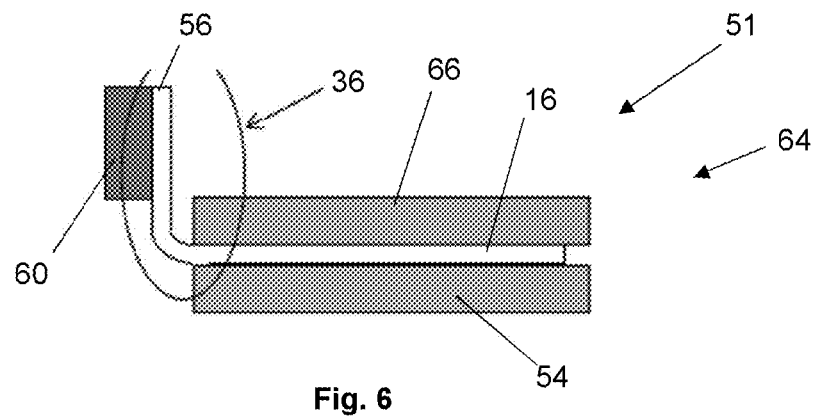

The seam connection device 64 especially has, as indicated in FIGS. 5 and 6, a holding device 62 for holding the first sub-element 16 and a bending device 60 for bending the edge region 36.

FIG. 5 shows a first embodiment of a step for forming the edge region 36, in order thus to form the foldover 38. In FIG. 5, for this purpose, an insert 58 is placed onto the sub-element 16 resting on a support 54, and the deformable edge region 36 is formed around the insert 58 by means of the bending device 60.

The bending device 60 may have a beam element which extends along the edge region 50 and which is pivotable about a pivot axis that runs at right angles to the plane of the drawing. In another embodiment, the bending device 60 may have a forming surface that moves along the edge region 36 for bending of the edge region 40.

The insert 58 may, for example, be a forming element. In one configuration, the insert 58 may also be an already correspondingly creased edge region 40 of the other sub-element 18, 46 to be connected to the first sub-element 16.

The insert 58 and the support 54 may be part of the holding device 62.

FIG. 6 shows another working example of the fold connection device 64, where the holding device 62 includes the support 54 and an automatically movable holding jaw 66. The bending device 60 is designed to fold the edge region 36 to form the foldover 38 around the holding jaw 66. The holding jaw 66 thus serves solely to hold and form the interior of the foldover 38 and is removed after the forming of the foldover 38.

There are different options for the further procedure for forming of the seam connection 20. If the insert 58 is already formed by a foldover 42 or an edge region 40 of the other sub-element 18 of the seam connection 20, it is possible in a next step to consolidate the seam connection 20. In another variant executable especially with the configuration according to FIG. 6, it is first possible to consolidate a form of the foldover 38 of the first sub-element 16 that has been opened out to accommodate a foldover 42 or edge region 40 of the other sub-element.

Figure 7:
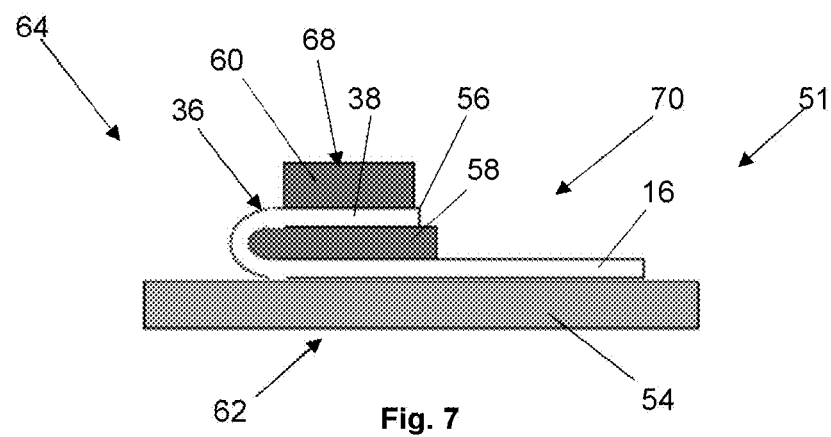
Figure 8:
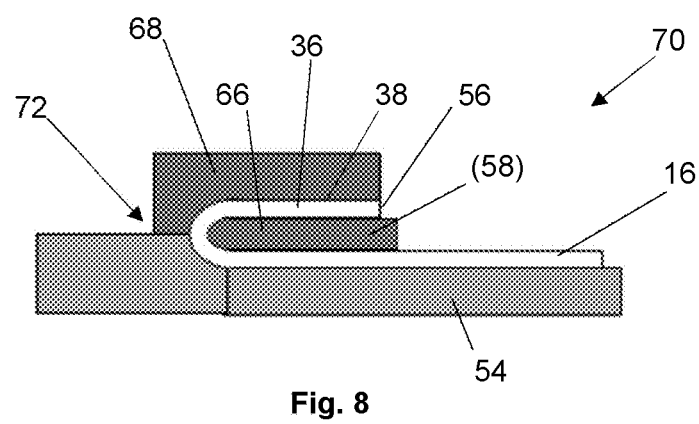

FIGS. 7 and 8 show different configurations of a device for such a consolidation of the still opened-out form of the foldover 38 on its own, or even of the entire seam connection 20. The insert 58 may, as mentioned above, be a seam formed by an edge region 40 of the connection partner—for example of the second sub-element 18—or part of the foldover 42, 48 of the further sub-element 18 to be connected to the first sub-element 16. Rather than the insert 58, it is alternatively possible to introduce the inner mold that is then to be removed therefrom (for example in the form of holding jaw 66).

In the embodiment shown in FIG. 7, in open configuration, by means of a press element 68 with employment of pressure and optionally heat, the desired form of the foldover 38 of the first sub-element 16 to form the seam connection 20 is achieved.

FIG. 8 likewise shows an embodiment of the consolidation device 70 for consolidating the shape of the foldover 38 or even of the entire seam connection 20, wherein the consolidating is effected in a closed mold 72.

Figure 9:
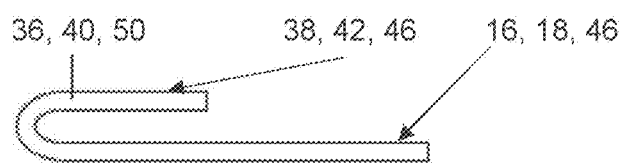
FIGS. 9-11 are cross-sectional views of different sub-elements that are folded to form seam connections.
Figure 10:
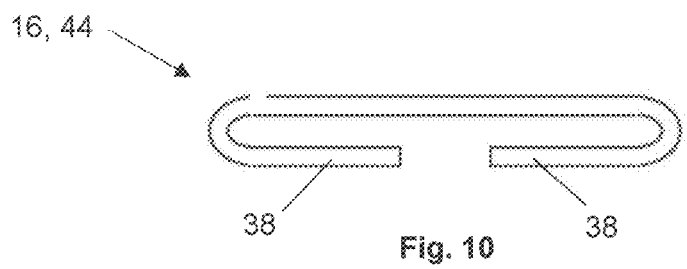
Figure 11:
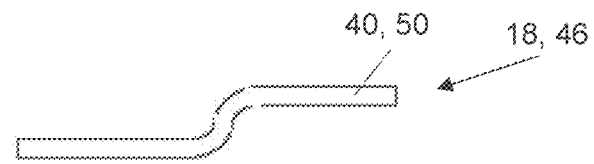
Figure 12:
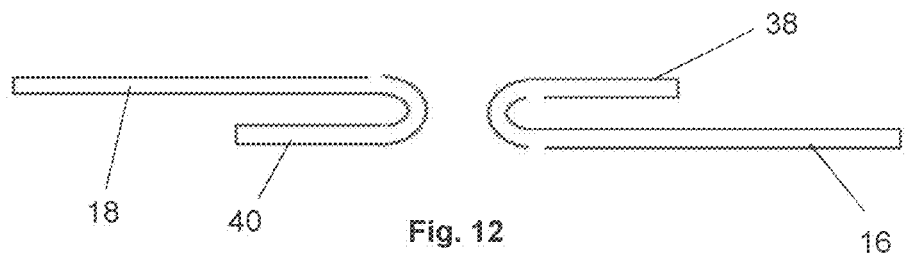
FIGS. 12-15 are section views of edge regions to be bonded of a first sub-element and a second sub-element to form the seam connection shown in FIG. 2.

FIGS. 9 and 10 show different examples of the profile form of the first sub-element 16 in the region of the seam connection 20. The first sub-element 16 may have been provided with the foldover 38 on one side only, for example, as shown in FIG. 9. Especially in the case of design of the first sub-element 16 as connecting element 44, the foldover 38 is formed on the two opposite longitudinal edges of the first sub-element 16, as shown in FIG. 10. The further sub-element 18, 46 to be connected to the first sub-element 16 may, for example, have a shape as shown in FIG. 9 or else a shape as in FIG. 11.

In the connection of the sub-elements 16, 18, both of which have the configuration with a foldover 38, 42 shown in FIG. 9, the result is a double lock seam. However, it is also sufficient when the edge region 40 of the second sub-element 18 is introduced into the foldover 38 of the first sub-element 16 in order thus to form a single seam or a standing seam.

The forming of the double lock seam is elucidated in detail by FIGS. 12-16.

Here, both the first sub-element 16 and second sub-element 18 are each provided with the foldover 38, 42 by the forming operation having the steps according to FIGS. 4-8.

Figure 13:
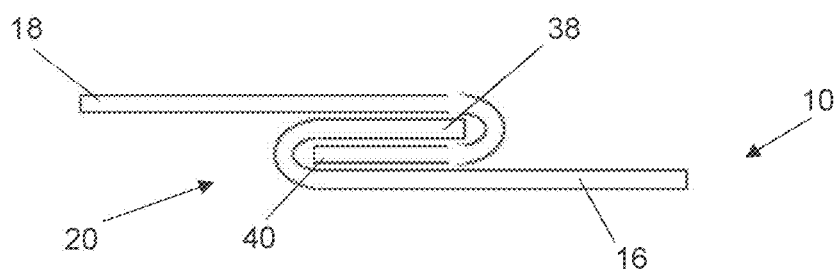
Figure 14:
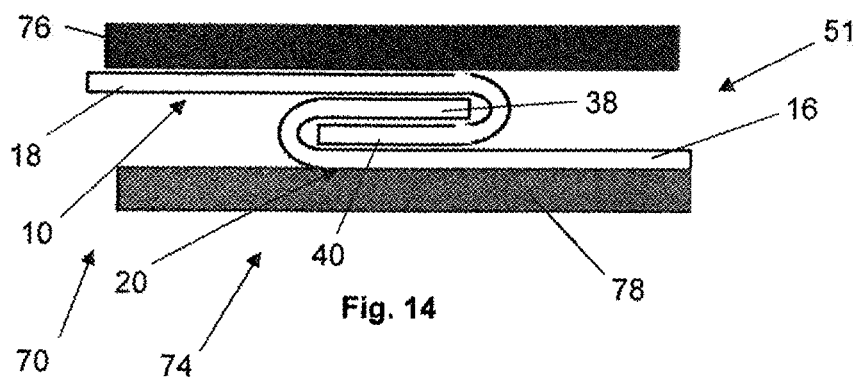

As shown in FIG. 13, the sub-elements 16, 18 are engaged with one another by their foldovers 38, 42 that are still in opened-out form.

Figure 15:
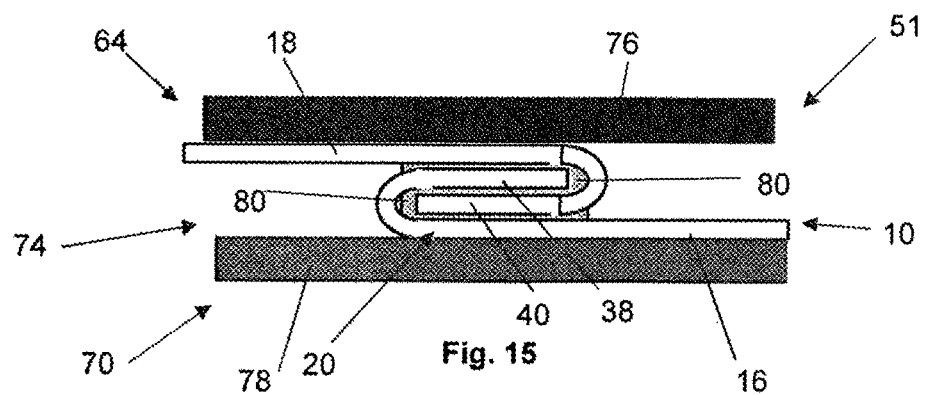

Subsequently, in a compression device 74, the mutually engaged foldovers 38, 42 are compressed, in order thus to form the seam connection 20. The compression device 74 may have a first compression jaw 76 and a second compression jaw 78. At least one of the compression jaws 76, 78 may have a heated design. The compression presses the respective legs of the foldovers 38, 42 against one another, and the result is tight folding between the joining partners which thus engage with one another both in a form-fitting and frictionally engaged manner FIG. 15 shows another variant of the compression step shown in FIG. 14 for final formation of the seam connection 20. In the configuration of FIG. 15, a filler material 80 is introduced into the seam connection to fill the gaps between the sub-elements 16, 18. The filler material 80 is selected to achieve desired properties of the seam connection, especially to achieve desired mechanical properties, for sealing purposes, for improving electrical conductivity, or the like.

Figure 16:
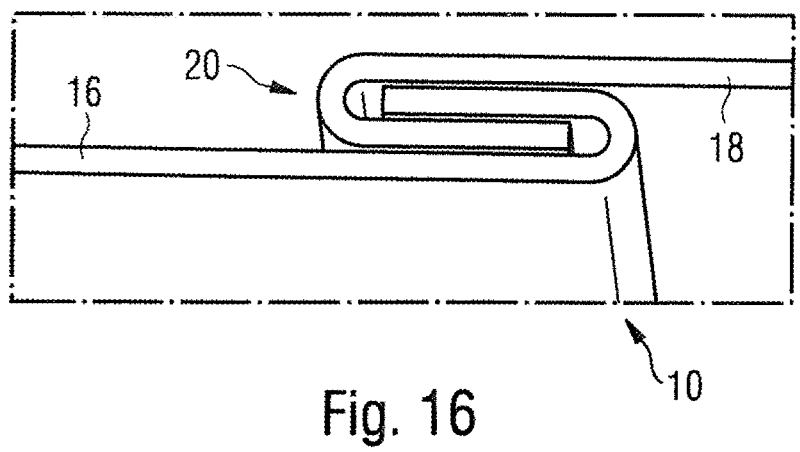
FIG. 16 is a photograph of a connection site between a first sub-element and a second sub-element, bonded by means of the seam connection according to FIG. 2.
Figure 17:
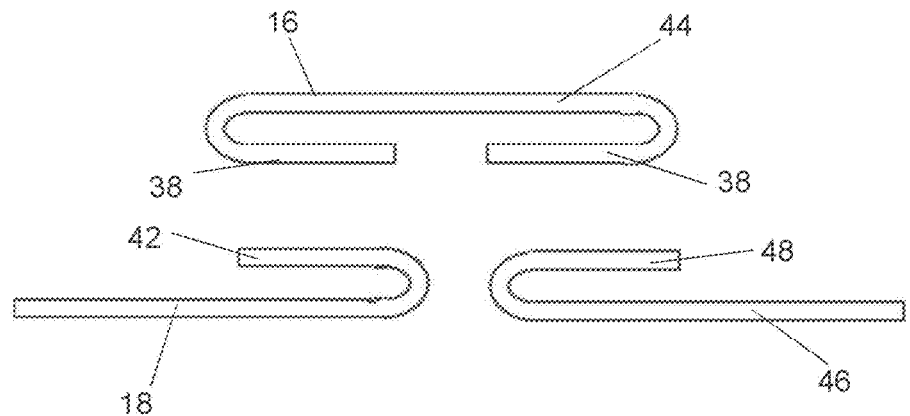
FIGS. 17-20 are profile views of a first sub-element, a second sub-element and a third sub-element during different steps of a method of producing the seam connection of FIG. 3.

FIG. 16 shows a photograph of a specific test example for the mutually intermeshed sub-elements 16, 18 shown in FIG. 13. It is possible here to clearly see the formation of the sub-elements 16, 18 from fiber composite material via mutually laminated fiber layers in a matrix.

FIGS. 17 to 20 show the corresponding steps and devices of the apparatus 51 as per FIGS. 12 to 15, except that they are configured here to form the embodiment of the seam connection 20 shown in FIG. 3. The design is analogous to the design of FIGS. 12 to 15, and so reference may be made to the above remarks. Here too, according to FIG. 20, the filler material 80 may be inserted to fill the gaps.

Figure 18:
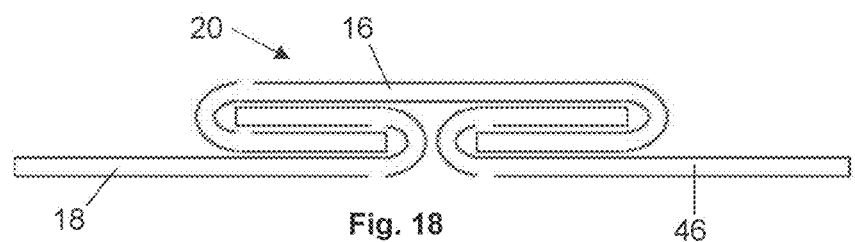
Figure 19:
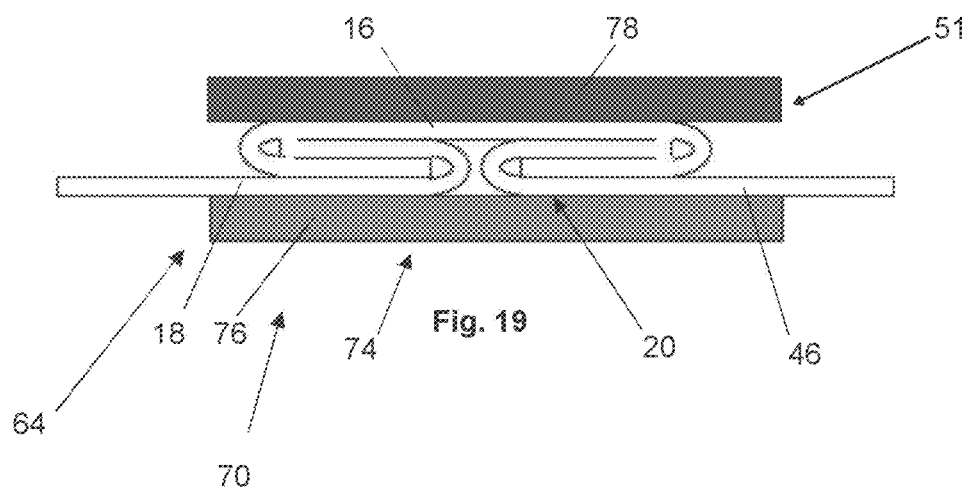
Figure 20:
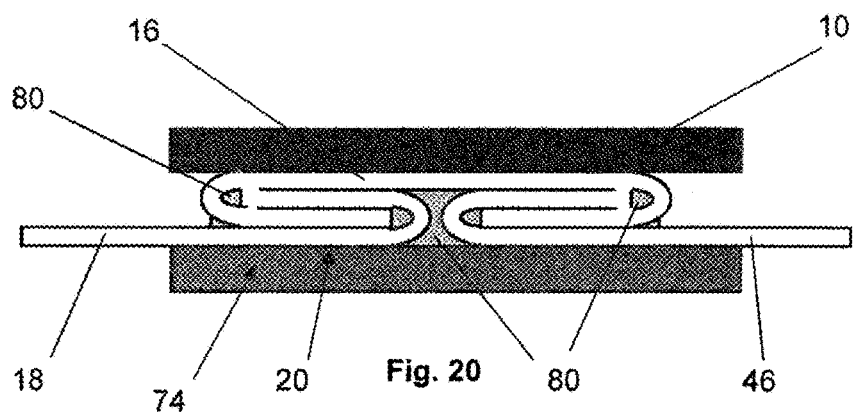
Figure 21:
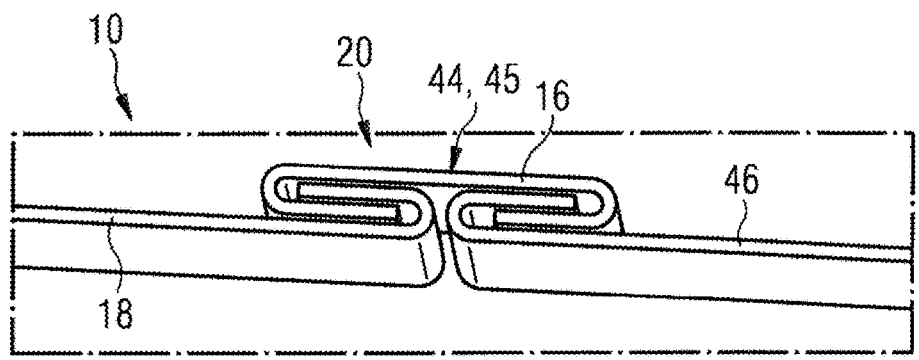
FIG. 21 is a photograph of an example of a seam connection formed according to FIG. 3 between sub-elements formed from fiber composite materials.

FIG. 21 correspondingly shows a photograph of the sub-elements 16, 18, 46 mutually engaged according to FIG. 18 by their foldovers 38, 42, 48. Here too, it is possible to clearly see the formation of the sub-elements 16, 18, 46 from fiber composite material.

Figure 22:
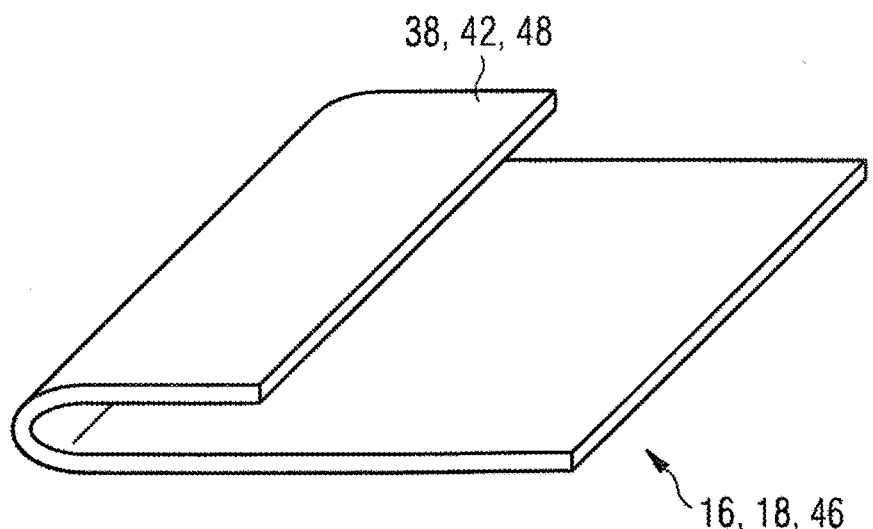
FIGS. 22-28 are perspective views of different working examples of folded structures and seam connections formed thereby.
Figure 23:
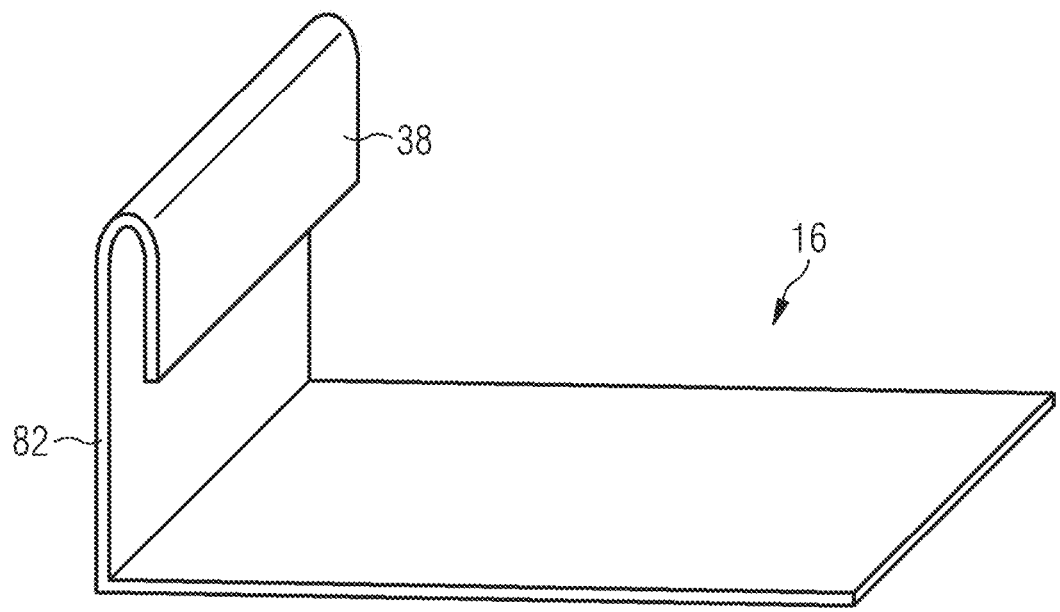

FIGS. 22 and 23 show different possible embodiments of one of the sub-elements 16, 18 for forming the seam connection.

FIG. 22 shows the first or second sub-element 16, 18 in a configuration as was also encountered in the above-elucidated embodiments of the seam connection.

FIG. 23 shows a design of the foldover 38 in an angle region 82 angled away from the remaining extent of the first sub-element 16.

Figure 24:
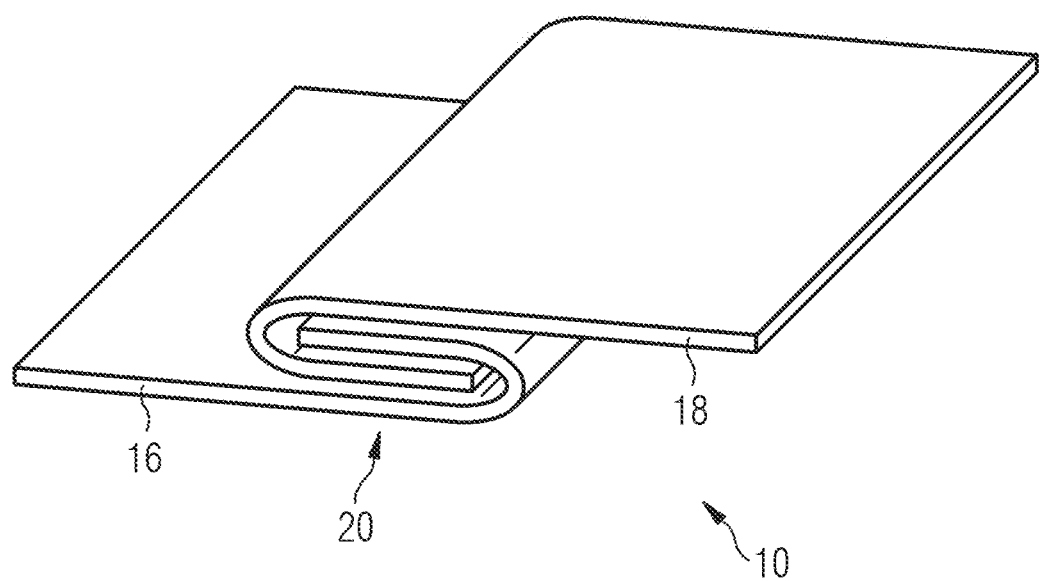

FIG. 24 shows a perspective view of the seam connection according to FIG. 2 composed of two sub-elements 16, 18 as shown in perspective view in FIG. 22.

Figure 25:
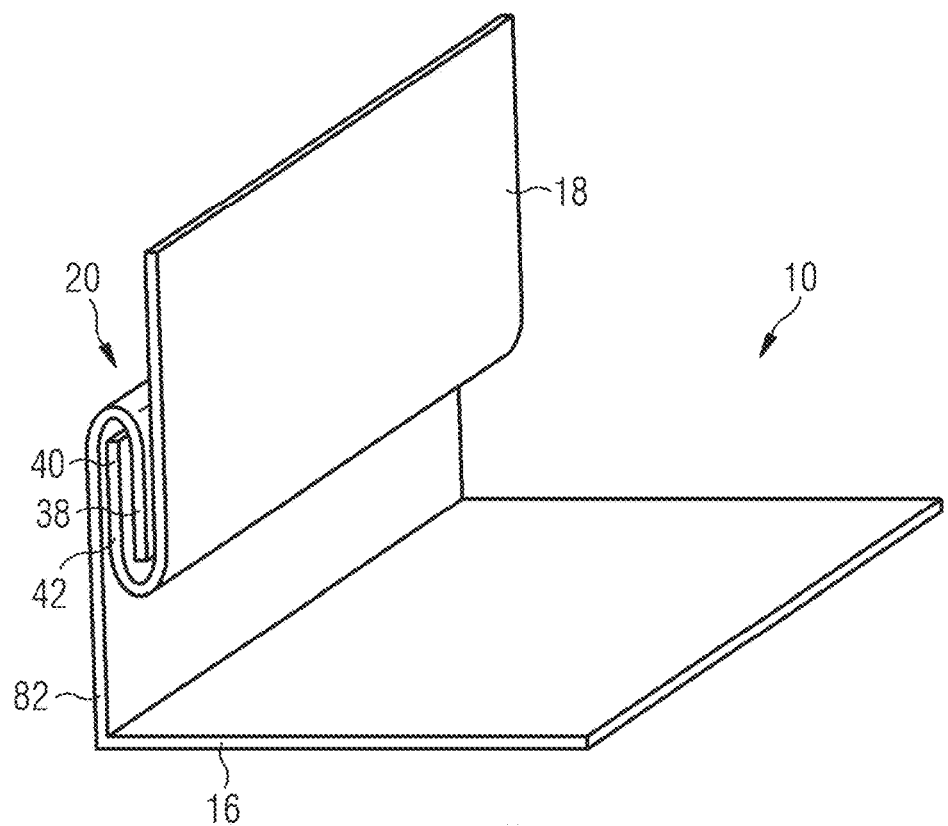

FIG. 25 shows one configuration of the seam connection 20 composed of the first sub-element 16 in the configuration according to FIG. 23 and of the second sub-element 18 in the configuration according to FIG. 22. This results in a connection of the sub-elements 16, 18 in a corner connection.

Figure 26:
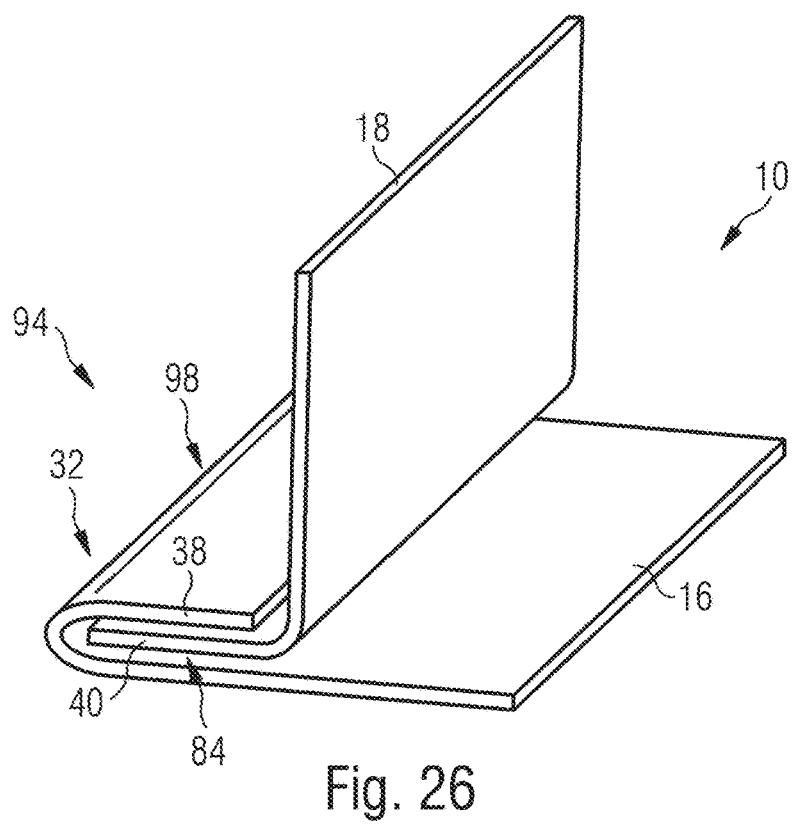
Figure 27:
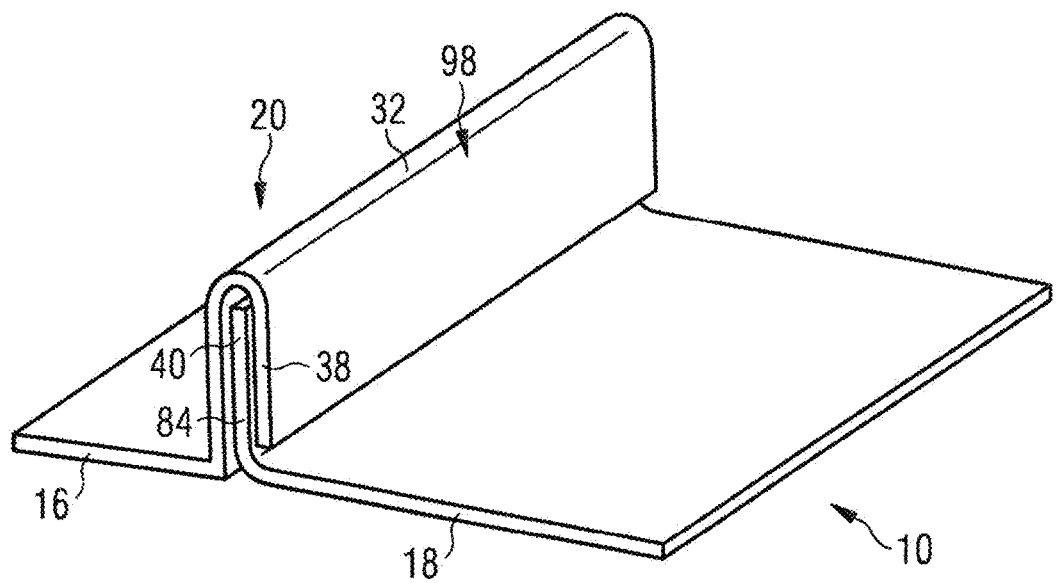

FIGS. 26 and 27 show a further configuration of the seam connection 20, where the second sub-element 18 has an edge region 40 angled away as a standing seam 84, inserted into the foldover 38 of the first sub-element 16. This makes it possible to form, for example, a reinforcing element 32, which reinforces the component 10, at a corner region (FIG. 26) or else in a two-dimensional region of the component 10.

Figure 28:
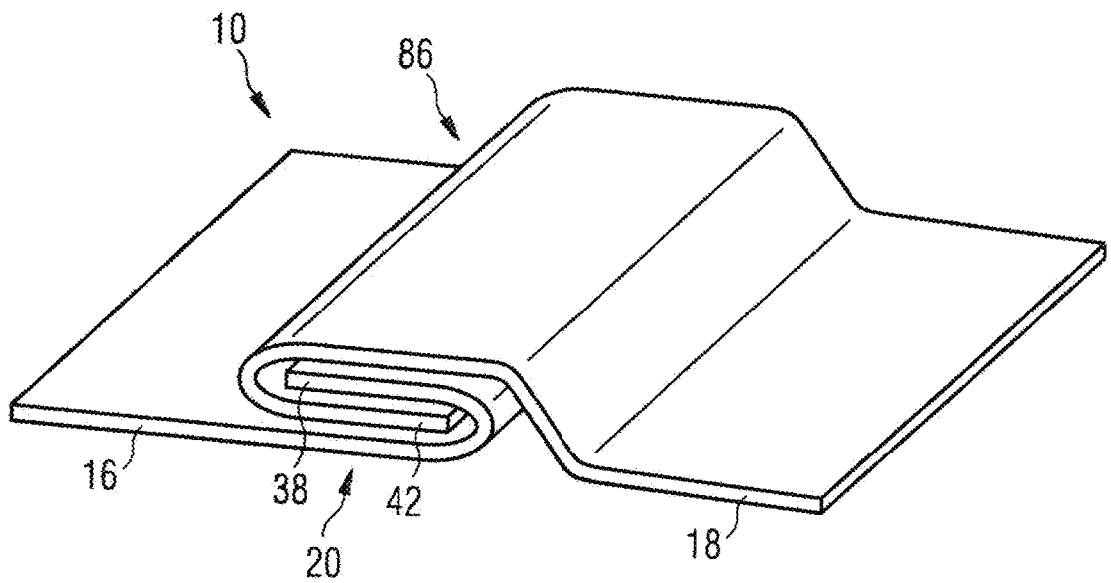

FIG. 28 shows one design of the flat lock seam connection 86. The flat lock seam 86 may, as shown in FIG. 28, be designed as a double lock seam and especially as a groove seam, meaning that, for example, the foldover of the first sub-element 16 has been inserted into the edge region 40 of the second sub-element 18 that has been provided with a foldover 42 and bent in the form of a groove from the plane of extension of the other sub-element 18.

Figure 29A:
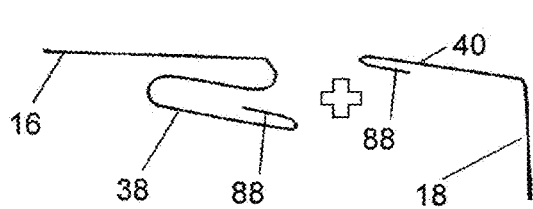
FIGS. 29a-29b are profile views of a first sub-element and a second sub-element during different phases for formation of an embodiment of a seam connection.
Figure 29B:
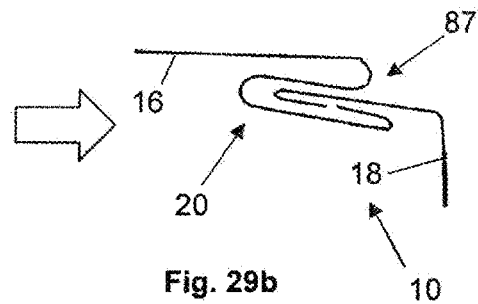

FIGS. 29a and 29b show joining steps for production of a snaplock seam connection 87. In a snaplock seam connection 87, hook elements 88 on the edge regions 36, 40 of the sub-elements 16, 18 engage with one another and prevent pulling-apart. More particularly, the hook elements 88 engage with one another in the joining operation.

FIGS. 30a-30c show different steps for production of what is called a

Pittsburgh lock connection 90, where the second sub-element 18 has merely an angled edge region 40 and the foldover 38 of the first sub-element 16 is extended at one end. The extended end is bent over after insertion of the edge region 40.

FIGS. 31a and 31b show the steps for joining and production of a corner connection 94 with a flat lock seam 86.

Figure 32A:
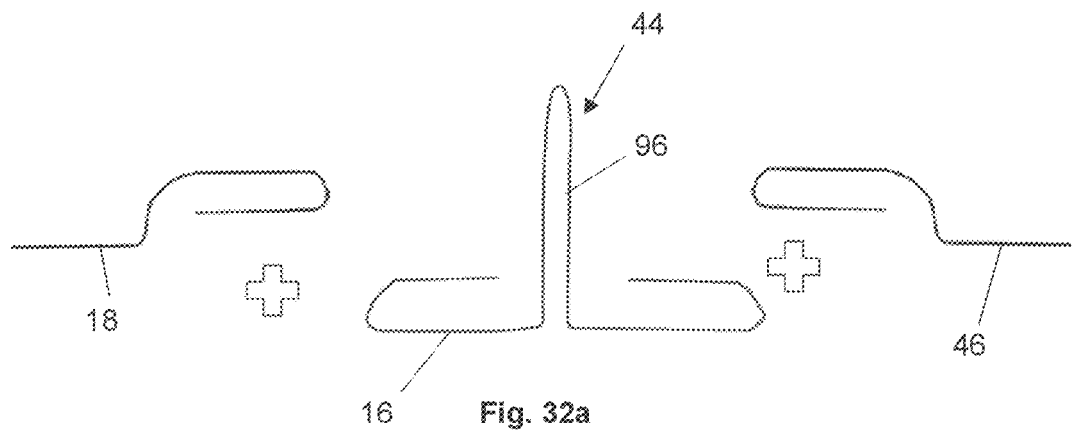
FIGS. 32a-32b are profile views of a first, a second, and a third sub-element during different phases for formation of a further embodiment of the seam connection.
Figure 32B:
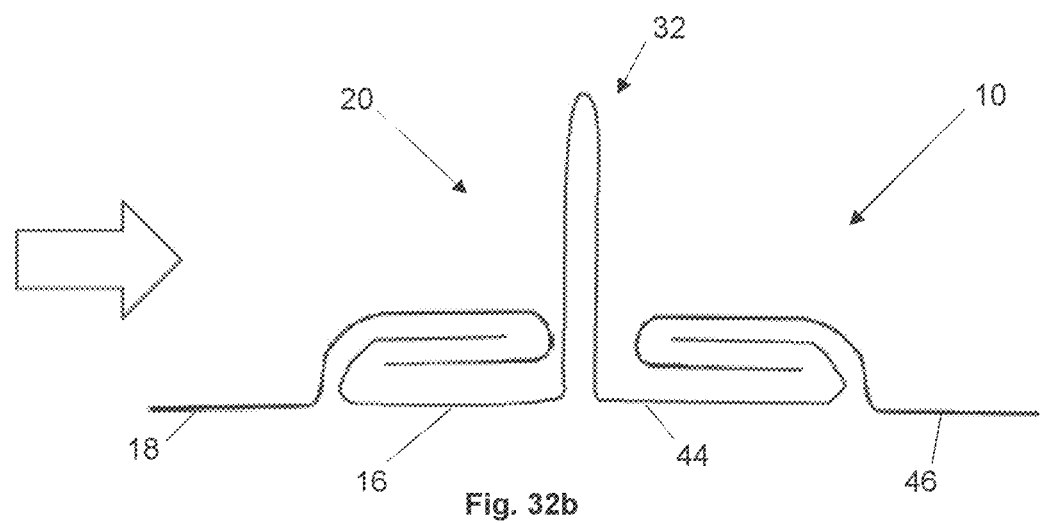

FIGS. 32a and 32b show a flange connection 20 in a modification of the seam connection 20 shown in FIG. 3, where the first sub-element 16 in the form of a connecting element 44 has a reinforcement fin 96. For instance, a reinforcing element 32 can be integrated into the component 10 by the seam connection. The reinforcing element 32, in the configuration shown in FIGS. 32a and 32b, has a reinforcement fin 96.

Figure 33A:
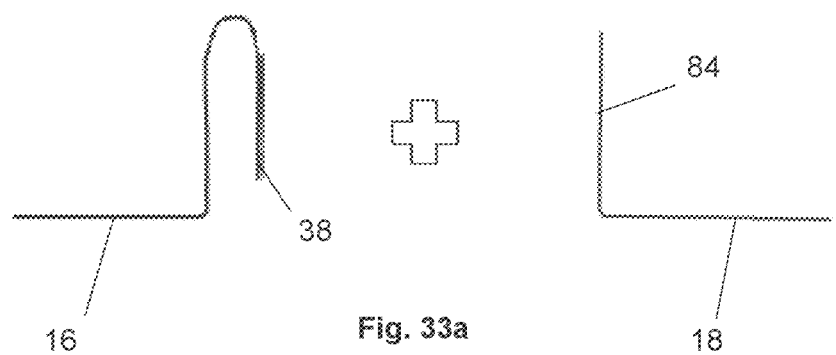
FIGS. 33a-33b are profile views of a first sub-element and a second sub-element for formation of a further embodiment of the seam connection.
Figure 33B:
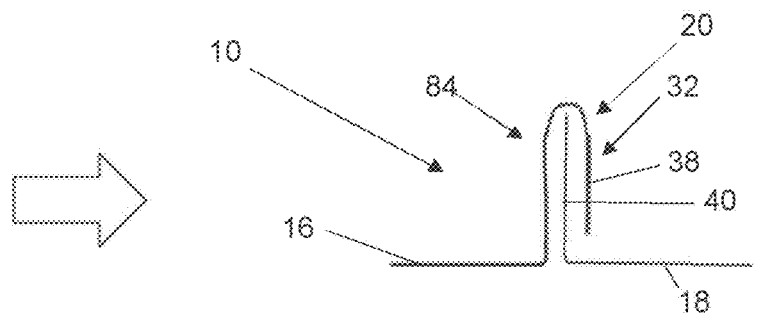

In the joining technique shown in FIGS. 33a and 33b for forming a further embodiment of the flange connection 20 as well, it is possible to integrate a reinforcing element 32. Here, the seam connection as already indicated in FIG. 27 is created. Here, the reinforcing element 32 especially has a projecting flange 98 formed by the edge region 40 of the second sub-element 18 and the foldover of the first sub-element 16 that has been folded around it.

Figure 34A:
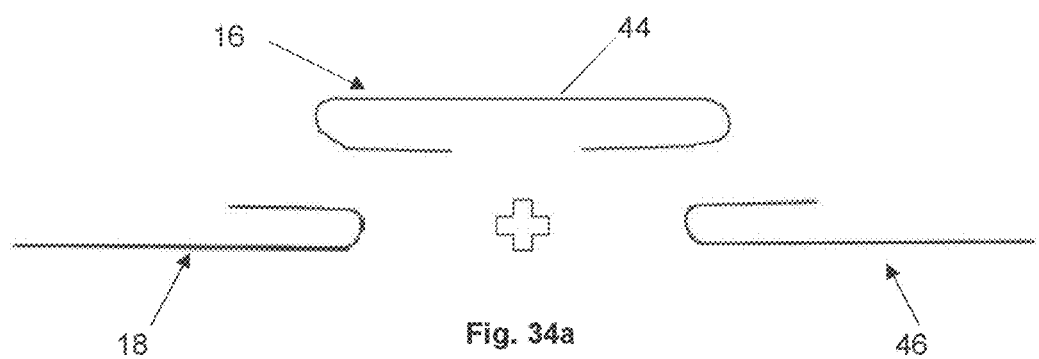
FIGS. 34a-34b are profile views of a first, second and third sub-element during different phases for formation of a further embodiment of the seam connection
Figure 34B:
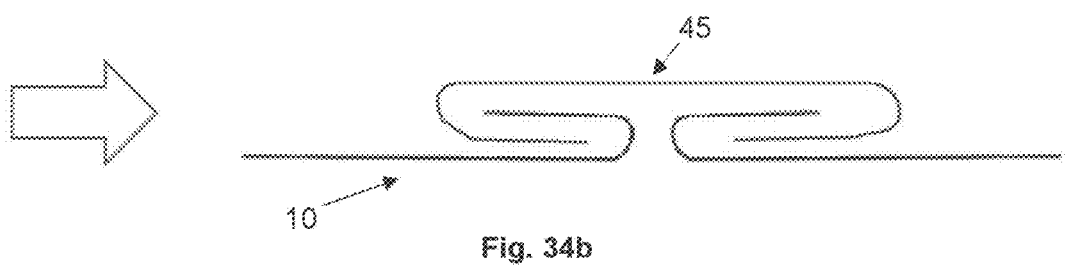

FIGS. 34a and 34b show the joining of the flange connection 20 according to the working example of FIG. 3.

Figure 35A:
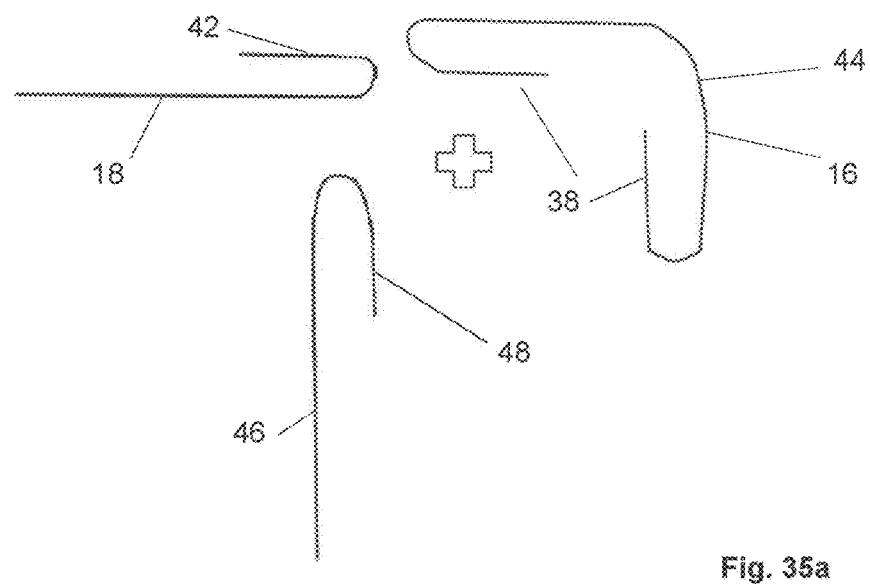
FIGS. 35a-35b are profile views of a first sub-element, a second sub-element and a third sub-element during different phases for formation of a further embodiment of the seam connection.
Figure 35B:
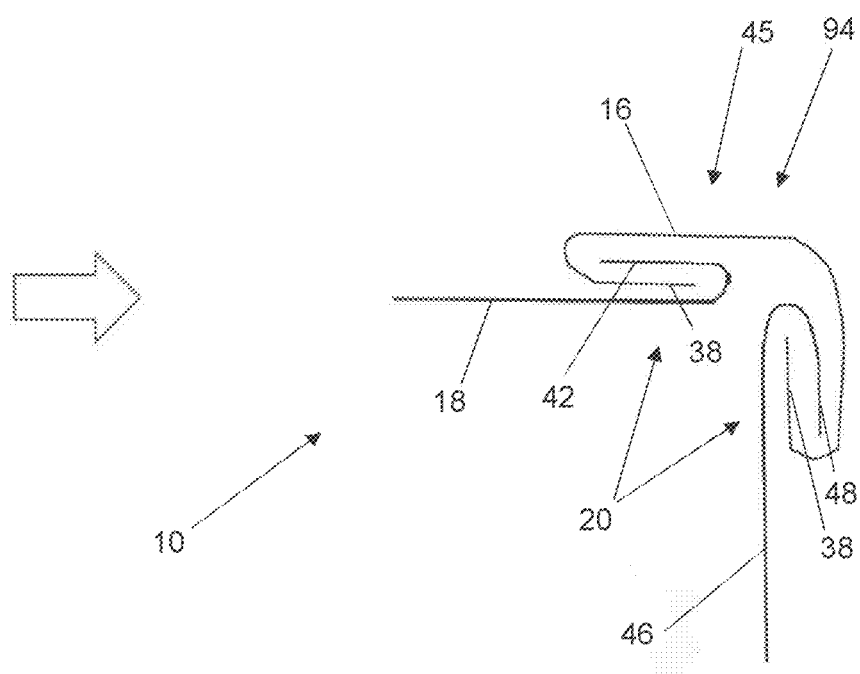

FIGS. 35a and 35b show a modification of this configuration, where the connection of the second sub-element 18 and the third sub-element 46 is not made in a mutually aligned manner, but around a corner. For this purpose, the first sub-element 16 that acts as connecting element 44 has an angled design.

In general, it is possible by the technology described here for folding of sub-elements 16, 18, 46 and for forming of seam connections 20 at the corresponding foldovers 38, 42, 48 to produce seam connections 20 as also known in principle in the field of connection of metal sheets.

Working examples of component 10 find use especially in vehicles, such as aircraft 12 in particular. The aircraft 12 is especially an airplane or else a helicopter or some other aircraft, for example a flying automobile. In general, the technology proposed here finds use wherever fiber composite elements are to be bonded to one another or to elements made of other materials. This may also be the case in land-based vehicles, for example automobiles. Connections in space vehicles or other components or constituents for space technology may be executed by the technology proposed here.

The connecting technique proposed here can be used to assemble constituents of an assembly—structure, cabin, floor, function system—of a vehicle or aircraft from sub-elements. Also possible is the connection of constituents of an assembly to constituents of another assembly.

For example, by the connecting technique proposed here, it is possible to integrate and optionally couple floor constituents, crash elements, brackets, pressure domes and constituents thereof into structural elements, cabin elements or system elements.

The technology can also be used for cabin installations and the coupling of cabin components.

Different embodiments of a component 10 with connected fiber composite material sub-elements 16, 18, 46 and a method and device for connecting the sub-elements 16, 18, 46 have been proposed.

In order to create connections of sub-elements 16, 18 of a component 10 for a vehicle, especially aircraft 12, formed at least partly from fiber composite materials with relatively low manufacturing complexity and equal or improved reliability and improved sealing compared to connections in common use to date for fiber composite components, different seam connections 20 between the sub-elements 16, 18 are proposed here. For this purpose, an edge region 36 of the first sub-element 16 that has been formed from fiber composite material is formed to give a foldover 38 that encompasses an edge region 40 of the other sub-element 18. Preferably, the forming, especially in the case of use of thermoplastic materials, is effected with heating, preferably of the entire edge region 36.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

10 component
11 fuselage segment
12 aircraft
14 connection site
16 first sub-element
18 second sub-element
20 seam connection
22 longitudinal connection
23 skin element
24 structure component
26 fuselage
28 connections extending in circumferential direction
30 cabin component
32 reinforcing element
34 fluid conduit
36 edge region (first sub-element)
38 foldover (first sub-element)
40 edge region (second sub-element)
42 foldover (second sub-element)
44 connecting element
45 cap strip seam
46 third sub-element
48 foldover (third sub-element)
50 edge region (third sub-element)
51 apparatus
52 heating device
54 rest
56 edge
58 insert
59 forming preparation device 60 bending device
62 holding device
64 seam connection device
66 holding jaw
68 compression element
70 consolidation device
72 closed mold
74 compression device
76 first compression jaw
78 second compression jaw
80 filler material
82 angle region
84 standing seam
86 flat lock seam
87 snaplock seam connection
88 hook element
90 Pittsburgh lock connection
92 additional bend
94 corner connection
96 reinforcement fin
98 projecting flange

The invention claimed is:

1. A component for a vehicle, comprising:
a first sub-element made of a fiber composite material having an outwardly facing surface and an inwardly facing surface, and
a second sub-element having an outwardly facing surface and an inwardly facing surface,
wherein the second sub-element has been connected to the first sub-element by means of a seam connection having a foldover at an edge of the first sub-element,
wherein, in a region of the foldover, the outwardly facing surface of the first sub-element is in face-to-face relationship with the outwardly facing surface of the second sub-element.

2. The component according to claim 1, wherein
the second sub-element is formed from a fiber composite material, or
the second sub-element is formed from a metallic material.

3. The component according to claim 1, wherein the fiber composite material has a thermoplastic matrix material.

4. The component according to claim 1, wherein the seam connection is selected from a group consisting of a standing seam connection, a flat lock seam connection, a double lock seam connection, a cap strip seam connection, an external seam connection, an internal seam connection or groove seam connection, a Pittsburgh lock seam connection and a snaplock seam connection.

5. The component according to claim 1, wherein at least one of:
at least one of the sub-elements is a panel element;
at least one of the sub-elements is or includes a reinforcing element for a panel;
at least one of the sub-elements has been formed by laminating layers of fiber composite material;
a stiffening element for a panel has been formed by at least a sub-region of the seam connection;
the component is a component for an aircraft;
the component has a third sub-element connected to at least one of the first or second sub-element by means of a seam connection;
the component has a third sub-element composed of fiber composite material which has been connected to at least one of the first or second sub-element by means of a seam connection;
the second and a third sub-element are connected via the seam connection by means of the first sub-element, where the first sub-element is selected from a group consisting of a connecting element, a reinforcing element, a reinforcing element with a projecting flange, a reinforcing element with a projecting reinforcement fin and an angled reinforcing element;
the fiber composite material is selected from a group of fiber composite materials consisting of CF/PPS composite material, CF/PEKK composite material, CF/PEEK composite material, CF/PA composite material, fiber composite material with carbon fibers in a thermoplastic matrix, fiber composite material with embedded metal mesh, fiber composite material with embedded bronze mesh, fiber weave in a plastic matrix, unidirectional fibers of a plastic matrix, fibers in a PEEK matrix, fibers in a PA matrix, composite material comprising a mixture of thermoplastic materials with metallic materials, composite material comprising a mixture of thermoplastic materials with aluminum materials, composite material comprising a mixture of thermoplastic materials with titanium materials; carbon fiber weave in a PPS matrix, unidirectional carbon fibers in a PPS matrix, PEKK-impregnated carbon fiber weave, carbon fiber weave in a PEKK matrix, unidirectional carbon fibers in a PEKK matrix, PEKK-embedded carbon fibers with bronze mesh and combinations of the aforementioned materials;
the fiber composite material includes fibers from a group of fibers consisting of carbon fibers, glass fibers, aramid fibers, synthetic fibers, fibers in a fiber weave, fibers in a fiber scrim and unidirectional fibers, and combinations of the fibers mentioned;
the fiber composite material has a matrix material from a group of matrix materials consisting of PE, PP, PA, POM, PET, PC, a transparent plastic, a transparent thermoplastic, transparent PC, PETG, PMMA, plastic alloys, thermoplastic alloys, a high-temperature plastic, a high-temperature thermoplastic, PTFE, PVDF, PEI, PEEK and PEKK.

6. The component according to claim 1, wherein a filler material has been inserted in at least one foldover of the seam connection.

7. An aircraft comprising the component according to claim 1.

8. The component according to claim 1, wherein, in the region of the foldover, the outwardly facing surface of the first sub-element is in face-to-face relationship with the inwardly facing surface of the second sub-element and the inwardly facing surface of the first sub-element is in face-to-face relationship with the inwardly facing surface of the second sub-element.

* * * * *